Feb. 1, 1944.   W. J. FIEGEL   2,340,653
MACHINE FOR BROACHING BEARINGS
Filed April 7, 1941   11 Sheets-Sheet 1
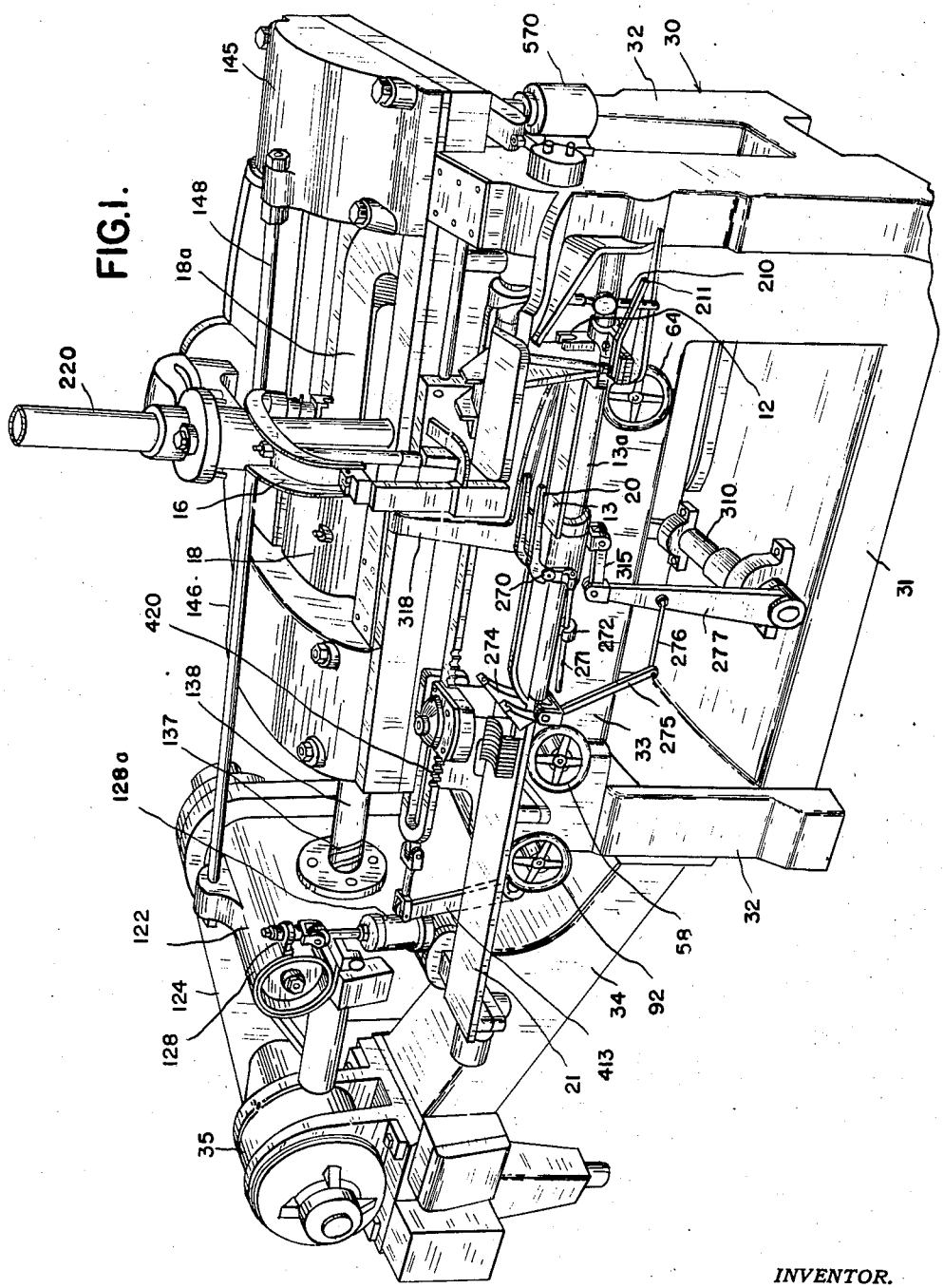
INVENTOR.
WILLIAM J. FIEGEL
BY
ATTORNEYS

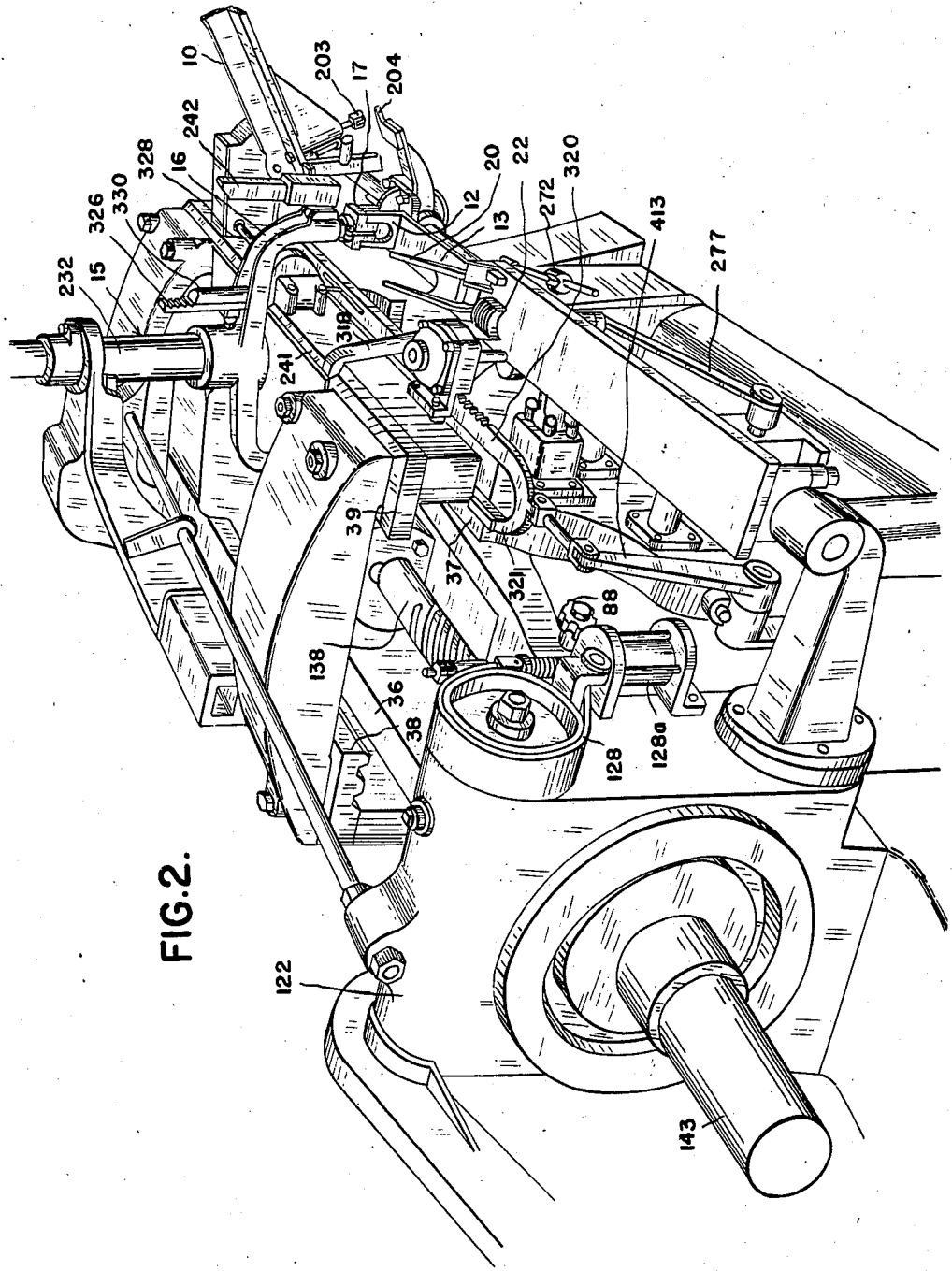

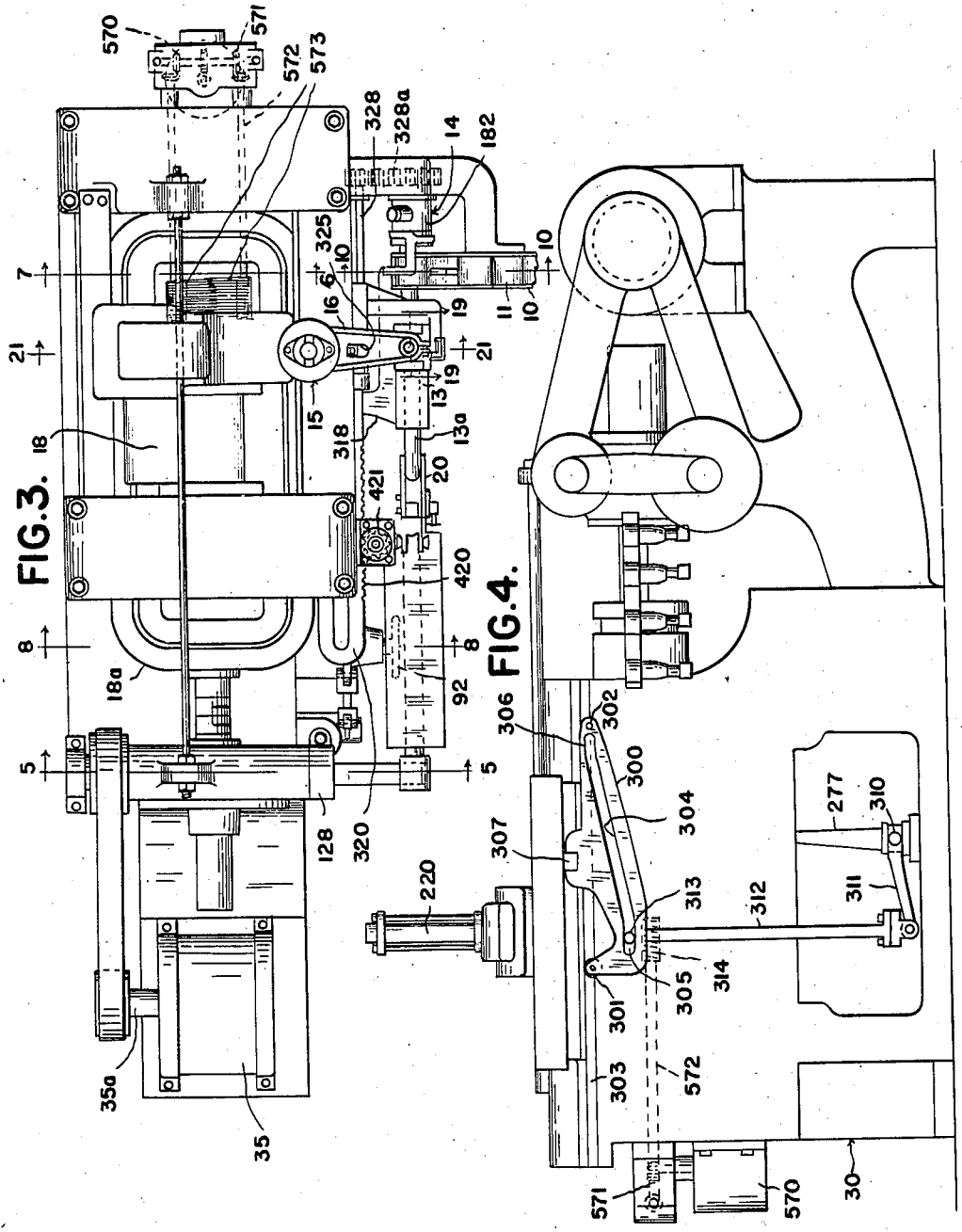

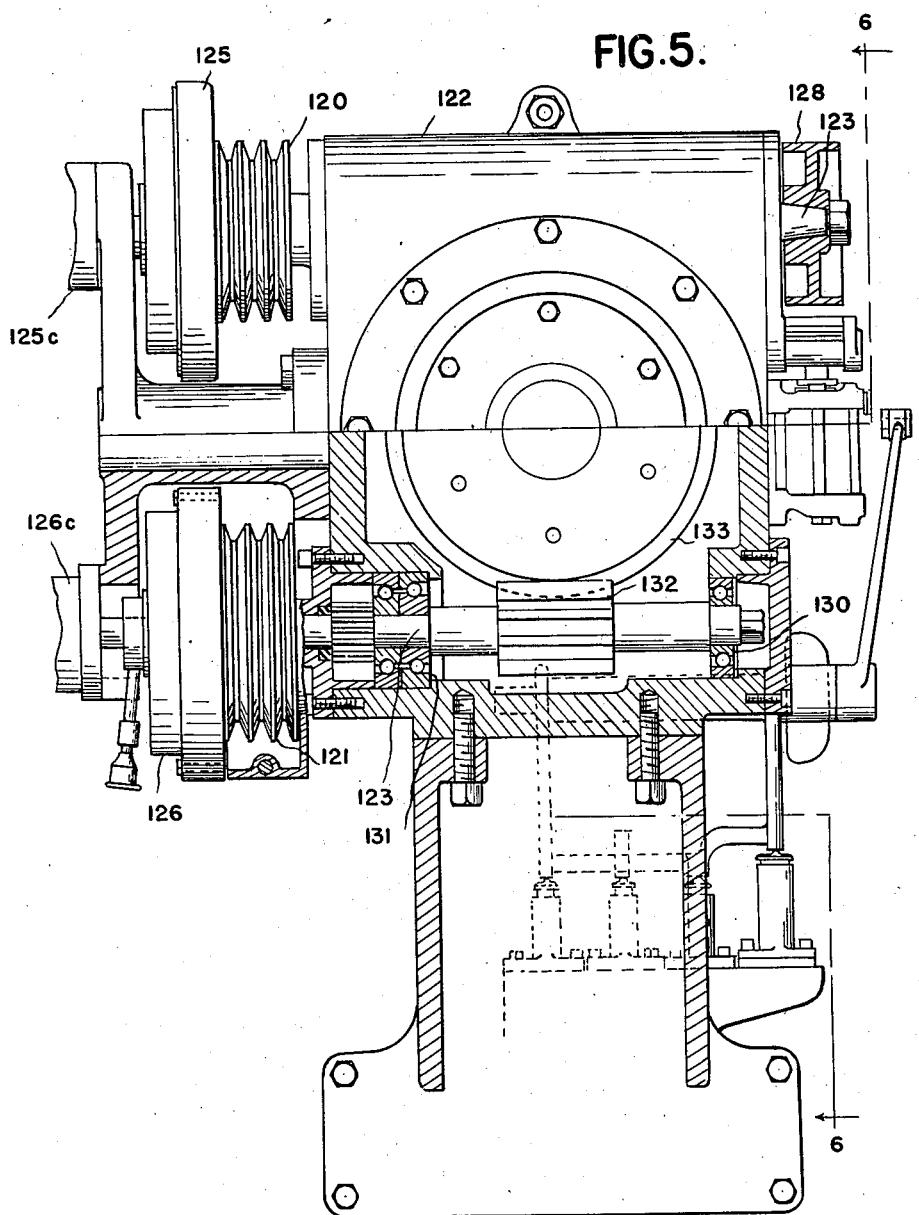

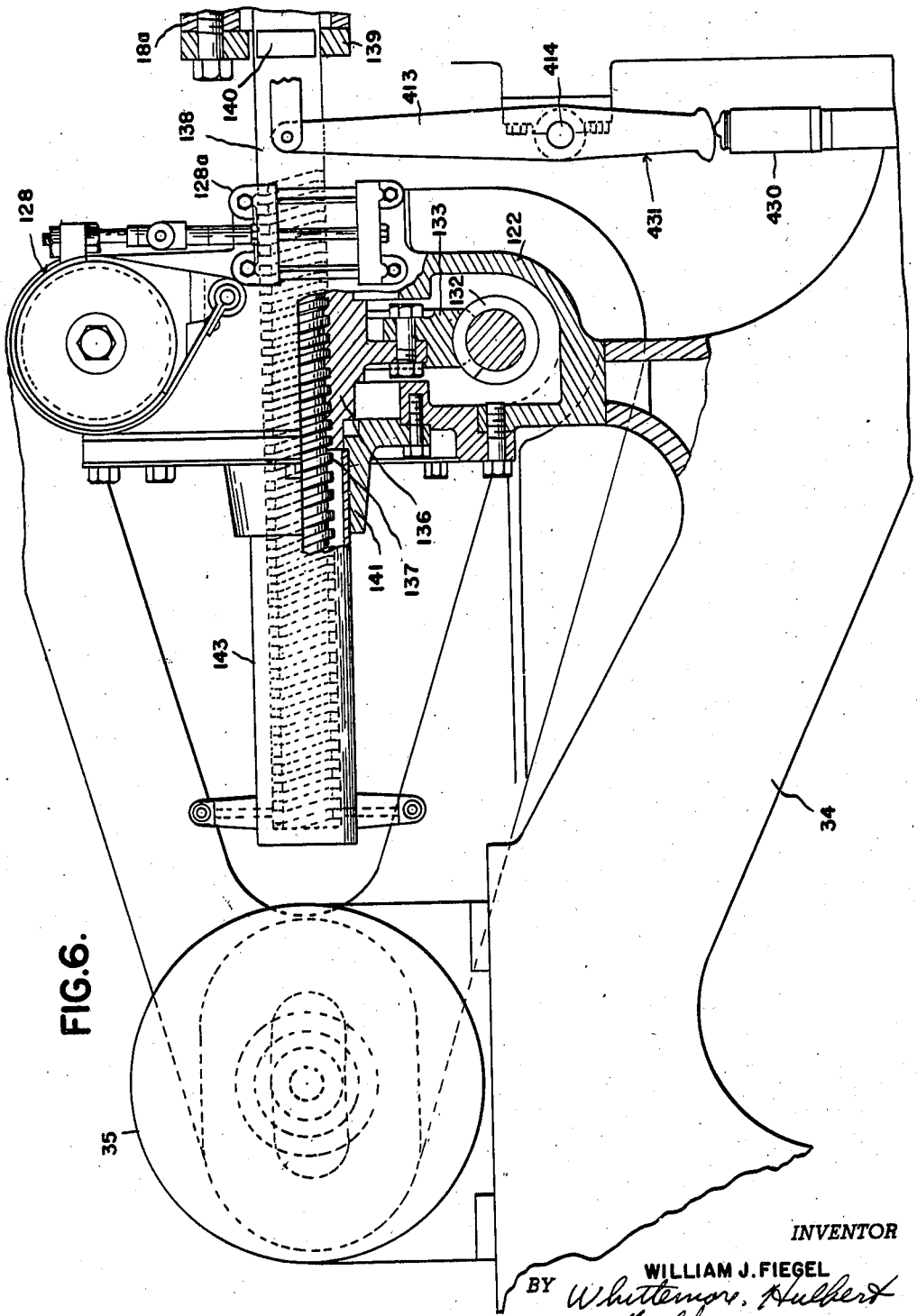

Feb. 1, 1944.  W. J. FIEGEL  2,340,653
MACHINE FOR BROACHING BEARINGS
Filed April 7, 1941  11 Sheets-Sheet 6

INVENTOR.
WILLIAM J. FIEGEL
BY Whittemore, Hulbert
& Belknap ATTORNEYS

INVENTOR.
WILLIAM J. FIEGEL
BY Whittemore, Hulbert
& Belknap ATTORNEYS

Feb. 1, 1944.  W. J. FIEGEL  2,340,653
MACHINE FOR BROACHING BEARINGS
Filed April 7, 1941   11 Sheets-Sheet 9

INVENTOR.
WILLIAM J. FIEGEL
BY Whittemore, Hulbert
& Belknap ATTORNEYS

Feb. 1, 1944.  W. J. FIEGEL  2,340,653
MACHINE FOR BROACHING BEARINGS
Filed April 7, 1941    11 Sheets-Sheet 10
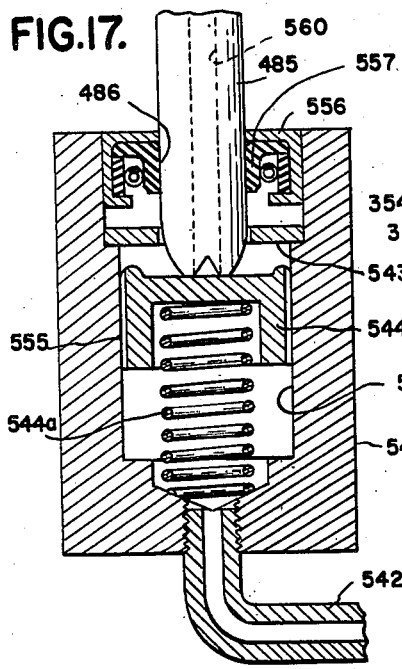
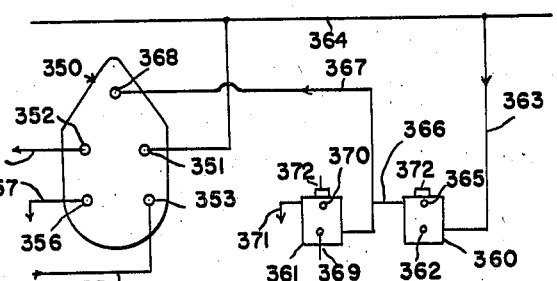
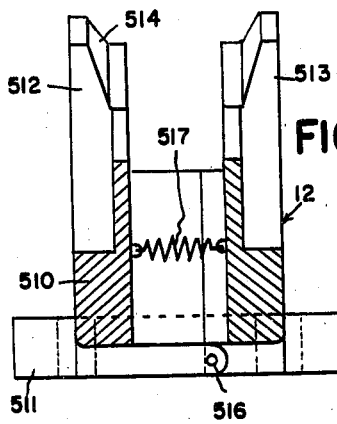
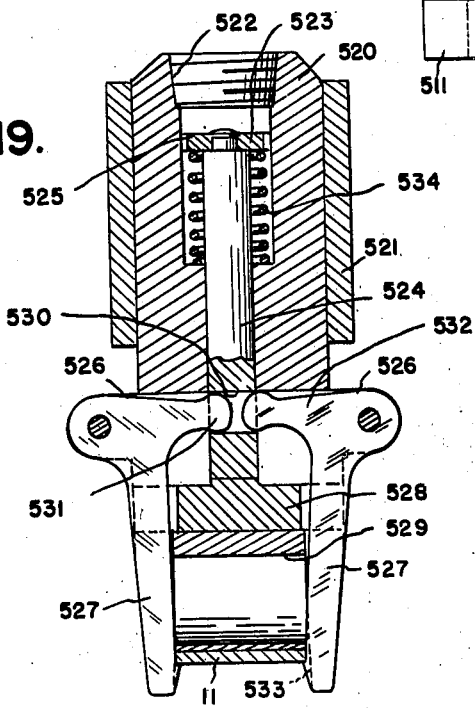
INVENTOR
WILLIAM J. FIEGEL
BY Whittemore, Hulbert
& Belknap ATTORNEYS

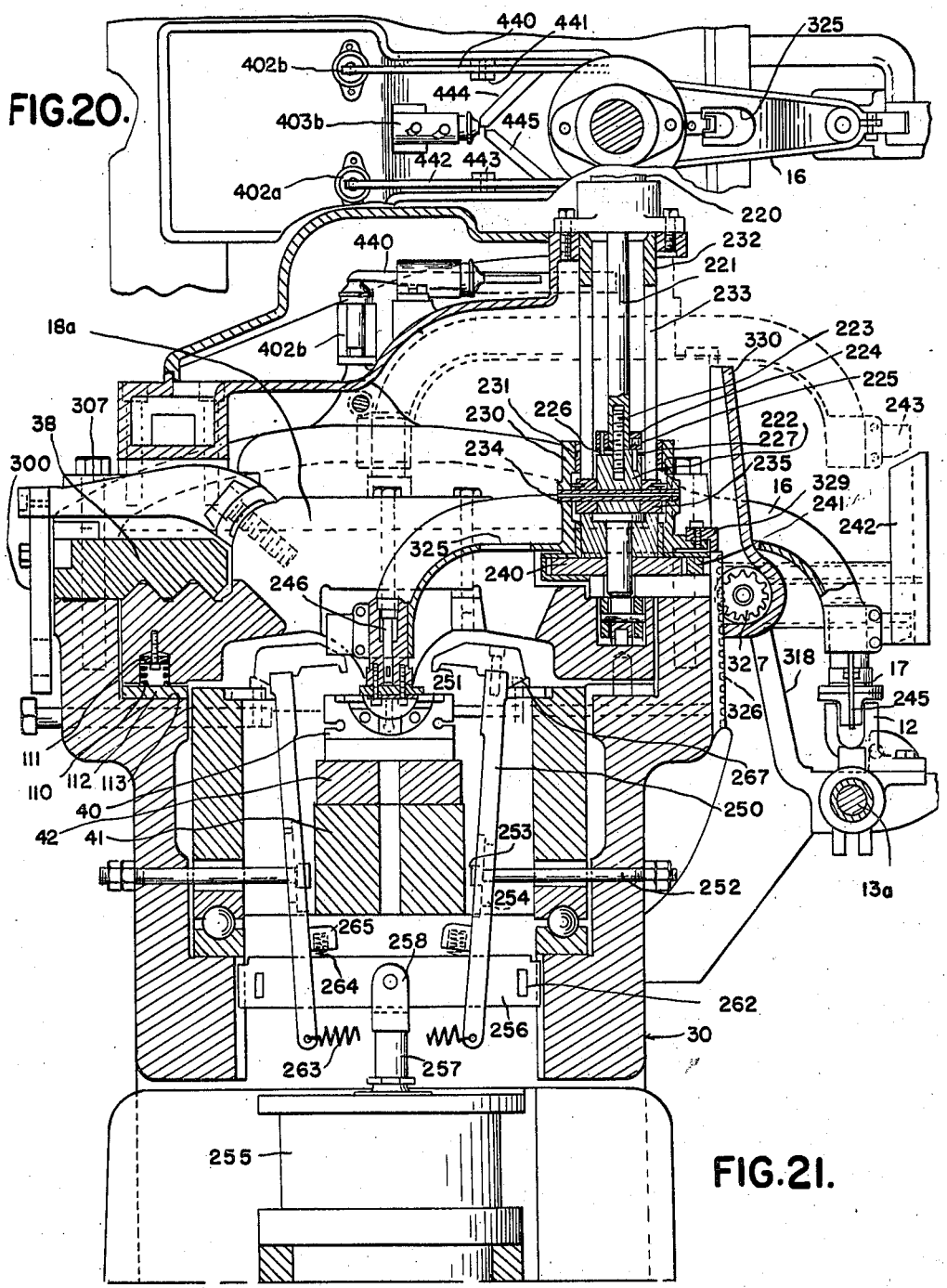

Patented Feb. 1, 1944

2,340,653

UNITED STATES PATENT OFFICE 2,340,653

MACHINE FOR BROACHING BEARINGS

William J. Fiegel, Detroit, Mich., assignor to Bohn Aluminum & Brass Corporation, Detroit, Mich., a corporation of Michigan Application April 7, 1941, Serial No. 387,317

35 Claims. (Cl. 90—33)

The present invention relates to a machine for performing an operation in the manufacture of journaled bearing liner segments. Segments of this type are employed as liners for journal boxes or bearings, and must be interchangeable. Accordingly, these parts must be kept within very narrow limits of finished dimensions.

Liners of the type referred to are essentially semicylindrical steel shells having bearing material on their inner surfaces. The bearing material is initially provided with excess thickness, and the operation referred to herein is the removal of excess bearing material to finish the segments to final dimension. The operation is preferably a broaching operation.

The machine forming the subject matter of the present invention is fully automatic, and requires the attendance of a single operator, whose task is merely to provide a supply of unfinished segments and periodically to remove an accumulation of finished segments.

Very briefly outlined, the operation of the machine is as follows: Unfinished segments are fed to the machine, which receives them serially from a supply device and positions them in a locator. A transfer mechanism picks the segments up from the locator and deposits them in a die. A clamp locks the segments in the die, and a broach is traversed relative to the die to finish-cut the bearing material to final dimension. The transfer mechanism then picks the finished segment out of the die, and means are provided for stacking the finished segments in partially nested relation.

The degree of accuracy required is very high, and means are provided for effecting necessary adjustments between the die and broach during operation of the machine. The machine is further designed to avoid shocks or jars by moving parts, and accordingly pneumatic control and actuation is employed. Cushioned air cylinders are provided for a number of operations, and reciprocation of the tool is effected by a pair of constant mesh, reversible worms and gradually engaging clutches.

Control of the sequential steps of operation is made to depend in part upon satisfactory completion of a preceding step, so that in the event of failure, the operation of the machine is interrupted until the difficulty which caused the interruption is cured.

With the foregoing brief summary of the machine in mind, it is among the objects of the present invention to provide a fully automatic machine of the character described adapted to perform the functions referred to.

More specifically it is an object of the present invention to provide an automatic machine having transfer mechanism for transferring unfinished work pieces from a supply serially to the machining mechanism and to transfer finished work pieces from the machining mechanism to a receiver located adjacent said supply.

It is a further object of the present invention to provide a machine in which adjustments between tool and work supports may be made without interrupting operation of the machine.

It is a further object of the present invention to provide a machine in which all movements of heavy operating parts is cushioned to avoid the introduction of errors by jars.

It is a further object of the present invention to provide a cyclically operating machine of the character described in which each step of the cycle is dependent upon completion of the preceding step.

It is a further object of the present invention to provide a cyclically operating machine having a special double reversible worm drive.

Other objects of the invention will be apparent as the description proceeds, and when taken in conjunction with the accompanying drawings, wherein:

Figure 1 is a perspective of the machine, looking from the right front;

Figure 2 is a perspective of the machine, looking from the left front;

Figure 3 is a plan view of the machine;

Figure 4 is a rear elevation of the machine;

Figure 5 is a partial section on the line 5—5, Figure 3;

Figure 6 is a partial section on the line 6—6, Figure 5;

Figure 16 is a diagram illustrating the operation of the pneumatic controls employed;

Figure 17 is a section through the air control structure for operating the stripping levers of the pick-up device;

Figure 18 is a vertical section through the bearing locator;

Figure 19 is a section on the line 19—19, Figure 3;

Figure 20 is a fragmentary plan view, partly in section, at about the section line 21—21, Figure 3, showing some of the air control system; and Figure 21 is a vertical section on the line 21—21, Figure 3, with the carriage moved to the right as seen in Figure 3.

Figure 7:
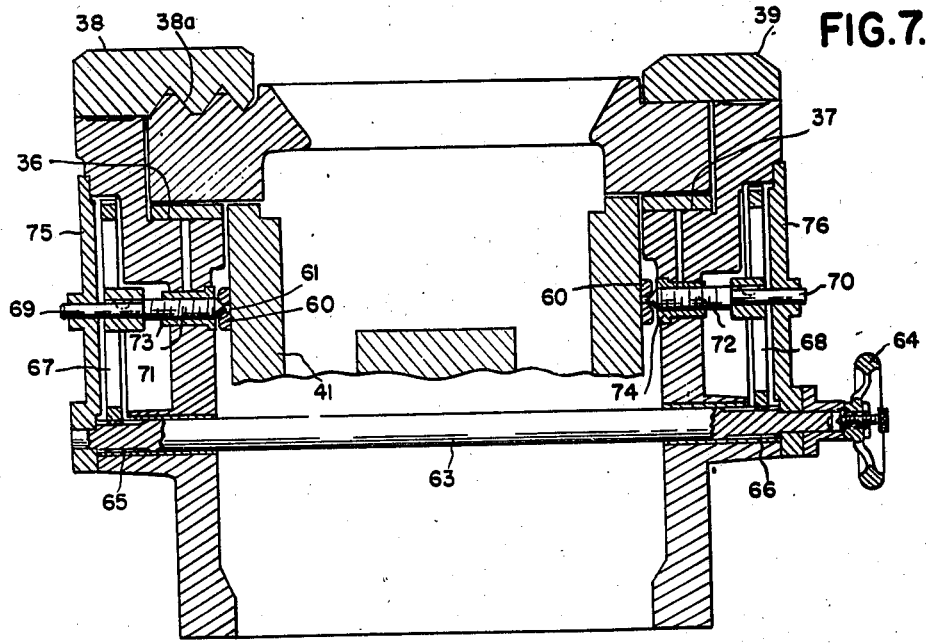
Figure 7 is a fragmentary section on the line 7, Figure 3.

Since the machine embodying the present invention is a rather complicated piece of mechanism, a brief description of the same will be given before proceeding to a more detailed description of the structural elements. For this purpose reference is made to Figures 1 to 4. This will facilitate an understanding of the description of the numerous subcombinations and details of the mechanism later to be described.

A chute indicated at 10 in Figure 3 is provided for receiving a plurality of unfinished bearing liners 11 and is inclined downwardly toward the machine, as best illustrated in Figure 2. The inclination of the slide or chute 10 is sufficient so that the unfinished bearing liners 11 proceed downwardly by gravity. A bearing locator indicated at 12 in Figure 2 is mounted on a slide 13 which, during operation of the machine, reciprocates between two limiting positions on a supporting rod 13a. In one limiting position the bearing locator 12 is positioned in line with the chute 10 and is adapted to receive an unfinished bearing therefrom. Turn-over mechanism indicated generally at 14 is provided for receiving one of the bearings 11 from the chute 10, inverting the same and depositing the same in inverted position in the bearing locator 12.

Following this the slide 13 moves to the left as seen in Figure 3 until the bearing locator is accurately aligned with the transfer mechanism indicated generally at 15, and including yoke 16. Yoke 16 is mounted for vertical reciprocation, and for oscillation through an angle of 180° about a vertical axis when in uppermost position. The sequence of movement of the yoke is a lowering, a raising, a 180° oscillation, a lowering, a raising, and a reverse 180° oscillation. The yoke 16 at the assumed point in the cycle is in elevated position as indicated in Figure 1, and it now moves downwardly and a pick-up device 17 engages the bearing 11. The yoke 16 then moves upwardly and rotates through 180°, which will position the bearing retained in the pick-up device 17 directly over a die for receiving the bearing. The yoke 16 then moves downwardly and deposits the bearing, then rises to clear other moving parts of the machine.

A clamping device clamps the bearing accurately in the die and a sliding carriage 18a, having a crosshead 18 carrying a broaching tool is traversed in cutting relation past the bearing, broaching the same to final dimension. With the crosshead 18 to the right after the cutting stroke, the yoke 16 again descends and picks up the completed bearing from the die. The yoke then rises and reversely rotates in a horizontal plane through 180°, locating the finished bearing over the slide 13.

By this time the slide 13 has been traversed to the right to the position shown in Figure 1, so that a bearing receiver 20 is now in line with the yoke 16. The yoke again descends and the finished bearing is dropped on the receiver 20. The slide 13 then moves to the left, and the bearing on the receiver 20 is transferred to a platform 21 where it is stacked in partially nested relation with previously machined parts, as indicated at 22.

The foregoing has traced the movements and operations performed upon a single bearing during its passage through the machine. Attention is directed to the fact that while an unfinished bearing is picked up from the bearing locator 12 by the pick-up device 17, a similar pick-up device on the other arm of the yoke 16 is picking up a completed bearing from the die. In like manner when the unfinished bearing is being deposited in the die prior to the machining operation, the bearing which was finished by the preceding stroke of the crosshead 18 is being deposited on the bearing receiver 20.

The machine is adapted to carry out the operation as just described in a fully automatic manner, it being necessary only for the operator to supply the bearings in downwardly concave position in the chute 10 and to remove the accumulated bearings as indicated at 22 from the platform 21. In addition the automatic operation of the machine is cyclically controlled with interdependent steps so that upon failure of any step the operation of the machine is arrested until the cause of the trouble has been located and cured. Further than this, a number of other novel features are embodied in the machine, such for example as the reversible worm drive which reciprocates the crosshead, and others which will be pointed out as the specification proceeds.

*General arrangement and adjustable features*

Proceeding now to a more detailed description of the actual mechanism which is illustrated in the preferred embodiment of my invention, I provide a heavy frame indicated generally at 30, comprising a base 31, columns 32 and an upper frame portion 33. A heavy motor bracket 34 is secured to the frame and carries a motor 35 which is adapted to reciprocate the tool carriage 18a. The carriage 18a is mounted for accurately guided reciprocation on accurately machined surfaces 36 and 37 (see Figures 2, 7 and 8) to which it is held down by members 38 and 39 respectively. Member 38 is provided with V-ways 38a which engage correspondingly shaped portions of the tool carriage so that the same will be reciprocated in straight-line relation. The parts which support and guide the tool slide are heavy accurately machined parts with the result that the broaching tool traverses in a straight-line path which is maintained during operation of the machine with great accuracy. The bearing die is indicated generally at 40 (Figure 21) and is supported on an adjustable die block support 41, a spacer 42 being indicated in this figure intermediate the die block 40 and the support 41. The support 41 comprises an elongated member, as best seen in Figure 9, and is pivotally supported in the frame 30 by means of a pair of balls 43 which are partially received within spherically finished recesses 44 and 45 in blocks 46 and 47 respectively. The upper blocks 46, as illustrated, are tapered and engage correspondingly inclined, accurately machined surfaces 48 of the support 41.

Means are provided for shifting the blocks 46 and 47 longitudinally of the machine, which will have the result of raising and lowering the bearing die or die block 40 relative to the path of traverse of the broaching tool. This means takes the form of a rod 50 connected to a yoke 51 which, in turn, connects to the lower die blocks 47. The shaft 50 is threaded at one end as indicated at 52, and a worm gear 53 is threaded over the threaded portion 52 of the shaft 50. The worm gear 53 is retained against longitudinal movement between shoulders by a web 54 of the frame and a separable member 55 cooperating therewith. Transversely of the machine is provided a shaft 56 having a worm 57 keyed or otherwise secured thereto and meshing with the worm gear 53. The shaft 56 extends to the front of the machine and terminates in the handwheel illustrated at 58 in Figure 1. As will be evident, rotation of the handwheel 58 will result in a raising or lowering of the die block 40.

In addition to the adjustment of the die block thus far described, a second adjustment is provided for moving the end of the support 41 which carries the die block 40 relative to the frame and transversely of the path of reciprocation of the broaching tool. This means is best illustrated in Figure 7 in which only a portion of the support 41 is illustrated. In order to prevent interference with vertical adjustment of the end of the support 41 while at the same time permitting accurate transverse movement thereof, I provide a pair of plates 60 having circular recesses or apertures 61 for receiving the pointed end of the adjusting members. The plates 60 will thus permit vertical movement of the support 41, while at the same time they are effective to move the same transversely and to retain the same tightly clamped in adjusted position. In order to effect transverse adjustment of the end of the support 41, I provide duplicate means at opposite sides of the support 41 together with connections which will provide for a withdrawal of one of the plates 60 equal to the forward movement of the other plate 60. This means takes the form of a shaft 63 which extends transversely across the machine and is provided with an operating handwheel 64 at the front of the machine. The handwheel 64 is also shown in Figure 1. The shaft 63, adjacent its opposite ends, is provided with pinion teeth, as indicated at 65 and 66, and meshing with the pinion teeth 65 and 66 are a pair of relatively large gears 67 and 68 respectively. Gears 67 and 68 are keyed to shafts 69 and 70, respectively, each of which terminates in a point which is received within the recess 61 provided in the corresponding plate 60. The shafts 69 and 70 are provided with threaded portions 71 and 72 respectively, which are received in threaded relation within sleeves 73 and 74, respectively, the sleeve being non-rotatively held within the frame. Removable plates 75 and 76 are provided in which the outer end of the shafts 69 and 70 respectively are journaled.

Initially, one of the gears 67 or 68 is rotated independently of the other until substantial pressure is applied to the support 41 through the plates 60, this relative movement between the gears 67 and 68 being accomplished before engagement of the pinion teeth 65 and 66 with the respective gears. After sufficient pressure has been applied between the plates 60 to insure rigidity, the pinion teeth 65 and 66 are meshed with the corresponding gears and thereafter rotation of the handwheel 64 will impart equal movement to the shafts 69 and 70. In other words, rotation of the handwheel 64 in one direction will advance the shaft 69 and retract the shaft 70 an equal amount. As a result of this, the bearing support 41 may be adjusted transversely, while in any position of adjustment it is retained firmly in clamped, adjusted position. Furthermore, the pressure applied between plates 60 while sufficient to insure rigidity of the parts is not sufficient to prevent vertical movement of the end of the bearing support 41 through the medium of the mechanism previously discussed.

The foregoing movements of the right-hand end of the bearing support 41, as illustrated in Figure 7, is permitted by reason of the connection between the supporting structure and the bearing support at its opposite end, as will now be described in conjunction with Figures 8 and 9. The left-hand end of the bearing support 41, as seen in Figure 9, comprises a terminal portion 80 connected to the right-hand end by a pair of arms 81, one of which is shown broken away to expose cooperating structure in Figure 9.

The support 41 is retained against longitudinal movement by means of blocks 82 and 83 which are retained in sliding relation against machined surfaces of the portion 80. Blocks 82 and 83 are each provided with recesses for receiving the pointed ends of bolts 84 and 85 respectively. The bolts 84 and 85 are received in correspondingly threaded portions of the frame. The arrangement is such that the support 41 is firmly retained against longitudinal displacement, while at the same time the pressure exerted by blocks 82 and 83 permits vertical adjustment of the left-hand end of the support 41 as seen in Figure 9.

Figure 8:
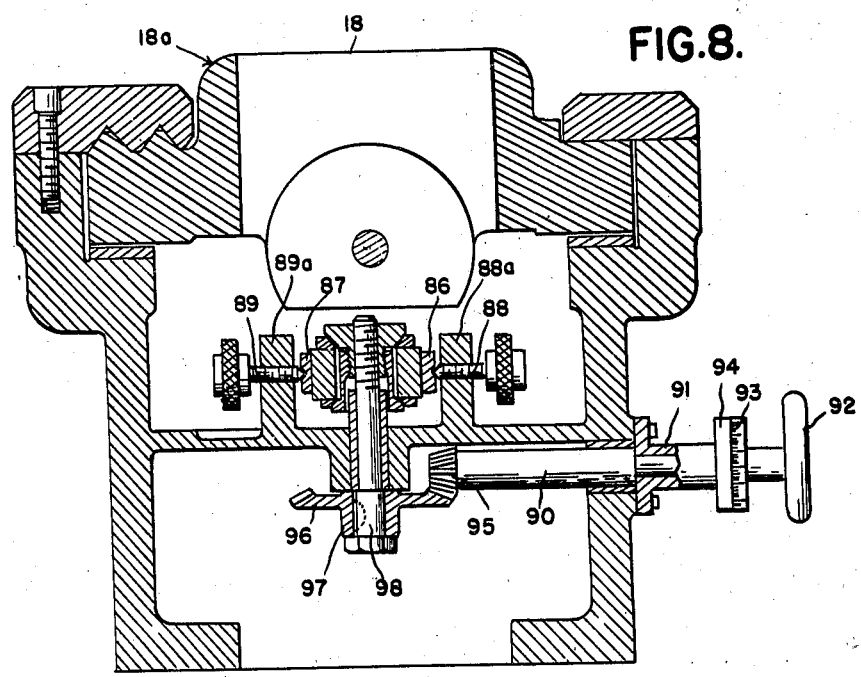
Figure 8 is a fragmentary section on the line 9—9, Figure 3.
Figure 9:
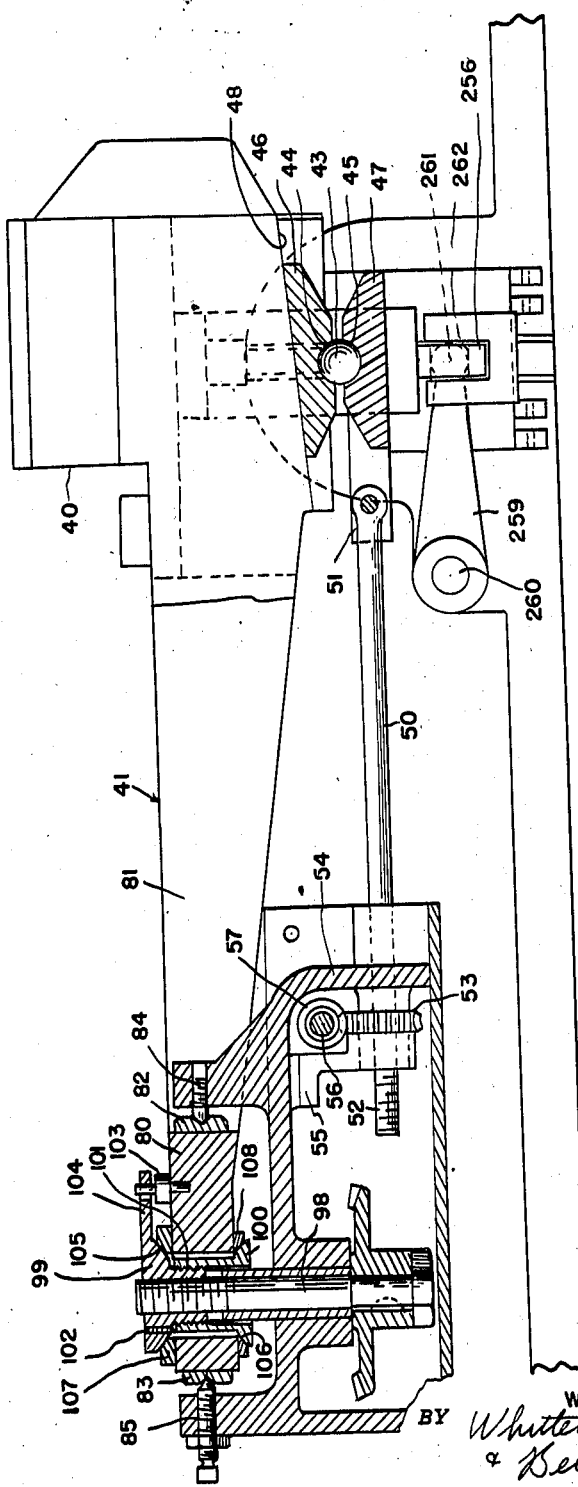
Figure 9 is a fragmentary vertical longitudinal section illustrating an adjustment of the machine.

As seen in Figure 8, a similar arrangement is provided to retain the left-hand end of the support 41, as seen in Figure 7, against transverse movement. This means comprises blocks 86 and 87 having seats for receiving the pointed end of clamping bolts 88 and 89 respectively. Bolts 88 and 89 are threaded in vertical webs 88a and 89a, respectively, and are provided with knurled heads by means of which they can be tightened to a desired degree by hand. The blocks 86 and 87, while retaining the end of the support 41 against transverse shifting, also permit vertical adjustment thereof.

Vertical adjustment of the left-hand end of the support 41, as viewed in Figure 9, is accomplished by means of mechanism shown in Figures 8 and 9. A shaft 90 is mounted for rotation in the frame, a journaled support 91 being bolted or otherwise secured to the frame. The shaft 90 terminates in a handwheel 92 and a micrometer scale 93 is formed for cooperation with a collar 94 of the support 91, the collar 94 having an index mark for cooperation with the graduations on the scale 93.

The shaft 90, at its inner end, terminates in a small beveled pinion 95 which meshes with a bevel gear 96, keyed or otherwise secured as indicated at 97 to a vertical shaft 98. An adjusting nut, best illustrated in Figure 9, is composed of an upper portion 99 and a lower portion 100, the two portions being threaded together as indicated at 101 and retained in assembled position by means of a lock screw 102. The upper portion 99 of the bolt is internally threaded and is in threaded engagement with the upper portion of the shaft 98. Rotation of the nut assembly is prevented by means of a pin 103 seated in a recess in the portion 80 of the support 41 and projecting through an opening in an extension 104 on the upper portion 99 of the bolt. Portions 99 and 100 of the bolt are provided with spherical surfaces, as indicated at 105 and 106, and seat against correspondingly shaped surfaces of washers 107 and 108 respectively. Rotation imparted to the shaft 98 by the handwheel 92 results in moving the left-hand end of the support 41 vertically. This motion of the left-hand end of the support 41 takes place as a swinging movement about an axis determined by the centers of the balls 43 previously referred to, and accordingly, due to the large radius of adjustment as well as the gear ratio between bevel pinion 95 and bevel gear 96, a very accurately controlled adjustment of the angularity of die blocks 40 carried by the support 41 is accomplished.

From the foregoing it will be observed that means are provided by virtue of which the die block which carries the bearing liners being machined may be very accurately adjusted relative to the unvarying path of the broach. Furthermore, these adjustments may be effected during operation of the machine. In other words, when a bearing is machined it may be accurately gauged, and if adjustments are found necessary they may be accomplished without disturbing the machine set-up as a whole, and in general each adjustment may be made independently of the others.

The final adjustments of the die block effected by the three handwheels 64, 92 and 58 are, in order, a transverse adjustment of the die block in a horizontal direction perpendicular to the path of reciprocation of the broach; second, a rocking of the die block about a transverse axis passing through the center of the balls 43; and third, a vertical adjustment of the die block relative to the path of reciprocation of the broach.

It will be observed that the transverse adjustment effected by the handwheel 64 actually is a swinging movement about the left-hand end of the support 41, but due to the large radius this is in effect a transverse adjustment and not an angular adjustment. However, in order that any slight deviation from alignment caused by the transverse adjustment referred to may be corrected, the left-hand end of the support 41 may be adjusted by means of the bolts 88 and 89 previously described and illustrated in Figure 8.

It may be mentioned at this time that the path of reciprocation of the broach is maintained with substantially absolute accuracy, in part by reason of the strong compression springs 110 shown in Figure 21 which insure firm pressure contact between the guiding V-ways 38a previously referred to. The springs 110 are received within seats 111 in the crosshead 18 and bear against plates 112 which slide on accurately machined surfaces 113 of the frame 39.

Tool carriage drive

The machine is provided with the motor 35 previously referred to which is effective to reciprocate the tool carriage 18a.

Referring first to Figures 1 to 6, the motor 35 is connected by means of V-belts (not shown) which are driven from the spindle 35a of the motor 35 and connect to sheaves 120 and 121 mounted in a housing 122. The V-belts are protected by a cover 124. Sheaves 120 and 121 are carried by shafts 123, mounted in frame 132, only the lowermost of which is illustrated in Figure 5 since the upper and lower drive shafts are identical. The shafts 123, being driven by a single series of V-belts, are both rotated in the same direction, and reversal of reciprocation of the tool carriage 18a and crosshead 18 is accomplished by means of a reversible drive later to be described. The sheaves 120 and 121 are mounted for rotation on the shafts 123 and are adapted to be connected thereto by clutches 125 and 126, respectively. In addition one of the shafts, and in the example illustrated the upper shaft 123, is provided with a friction brake 128, as seen in Figure 1. Automatic controls are provided which will alternately connect the sheaves 120 and 121 to their corresponding shafts, and the shafts are both brought to rest during the interval between energization of the clutches by means of the brake 128. The shafts 123 are supported for free rotation, suitable bearings for this purpose being indicated at 130 and 131. Each of the shafts is provided with a worm 132 which is provided with teeth extending at a substantial helix angle, as for example in the neighborhood of 35°. The worms 132 are each in constant mesh with a conjugate worm gear 133 and the arrangement is such that while the worm gear 133 is driven by one of the worms 132, the other worm is reversely driven by the worm gear. This is permitted by reason of the high helix angle of the worms.

Referring now to Figure 6, the worms 132 are shown in mesh with the worm gear 133 which, in turn, is bolted or otherwise rigidly secured to a nut element 136 which is internally threaded to cooperate with threads indicated at 137 formed on connecting rod 138. The connecting rod 138 is rigidly and non-rotatably connected to the tool carriage 18a by means of locating plates 139 engaging in seats 140 of the connecting rod 138.

The nut 136 is retained in the frame casting 122 against axial movement, a removable collar 141 taking the thrust in one direction and the nut 136 seating against a suitably shaped portion of the housing 122 at the right, as seen in Figure 6. From the foregoing it will be observed that rotation of the worm gear 133 in one particular direction will rotate the nut 136 and that this rotation of the nut 136 will feed the connecting rod 138 in one direction, while reverse rotation of the nut 136 will feed connecting rod 138 in the opposite direction.

The clutches 125 and 126 which operate to engage or disengage the sheaves 120 and 121 from their respective shafts are pneumatically operated, and also the brake 128 is pneumatically operated, corresponding air cylinders 125c, 126c and 128a being provided for the purpose of operating the clutches and brake.

When the crosshead is moved to the left, as seen in Figure 6, the threaded end of the connecting rod 138 extends to the left considerably beyond the nut 136 and the housing 122, and in order that the projecting end of the connecting rod shall be at all times covered and protected I provide a sleeve 143 which is seated within a collar on the abutment 141 previously referred to.

In order to insure extreme rigidity of the machine, the parts are strongly braced, as best indicated in Figure 1; the side elements of the frame are interconnected at each end by heavy castings 145 and 146. Casting 145 is connected to the housing 122 by longitudinal bracing rod 148 which lends additional support and rigidity to the bracket 34.

Work transfer and piling mechanism

It will be recalled that the individual bearing liners are placed in the inclined chute 10 and are thereafter handled in fully automatic manner until the completed bearings are assembled in partly nested relation as indicated at 22 in Figure 2. The mechanism which performs the movement of the bearing liners will now be described in detail.

Figure 14:
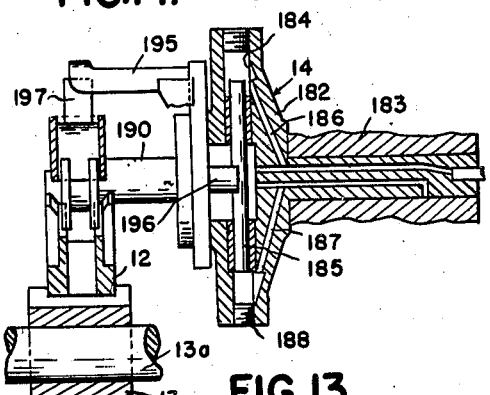
Figure 14 is a section on the line 14—14, Figure 13.
Figure 13:
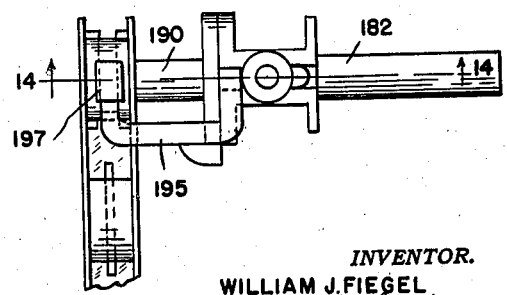
Figure 13 is a plan view of the turn-over mechanism.

Reference is first made to Figures 10 to 14. In these figures the chute 10 is indicated as having a floor portion 180 and side walls 181. The inclination of the floor portion 180 is such that the bearings 11 slide by gravity. A turn-over device indicated generally at 14 is mounted in position to receive individual bearing liners, to invert the same, and to deposit the same on the bearing locator 12. Referring first to Figure 14, the turn-over mechanism comprises a casting 182 which is mounted for rotation in a portion of the frame indicated at 183. Rotation of the casting 182 is accomplished through the medium of the gears 328a later to be described, and is accordingly operated in timed relation to the raising and lowering of the yoke 16, but only on alternate strokes thereof, as will appear.

The casting 182 has a central bore 184 in which a piston rod 185 is mounted for reciprocation. Air conduits 186 and 187 are provided for admitting air alternately to opposite ends of the piston rod 185. The bore 184 is adapted to be closed at each end by threaded plugs 188.

Figure 10:
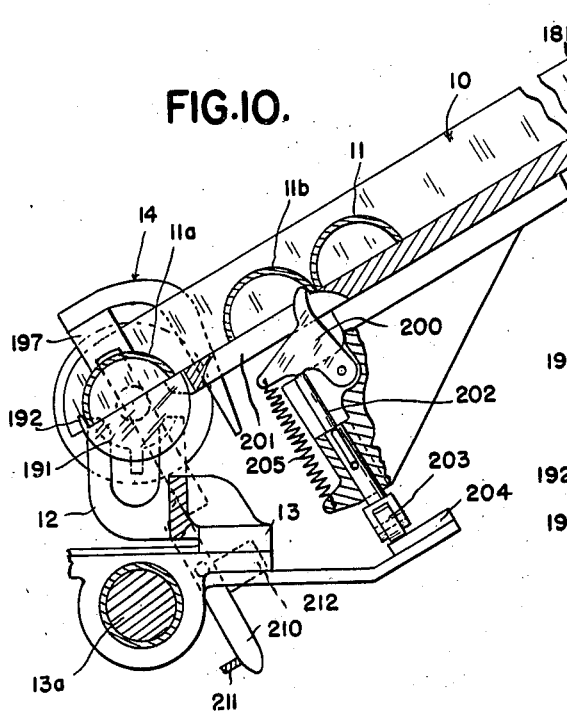
Figure 10 is a section on the line 10—10, Figure 3.

Bolted or otherwise secured to the left-hand end of the casting 182, as seen in Figure 14, is a cradle member 190 having a half-round cradle 191, best seen in Figure 10, which is also provided with a stop finger 192. The bearings 11 slide down the chute 10 until one of the bearings is stopped by the finger 192.

Clamping means are provided for retaining the bearing on cradle 191 against the finger 192 during rotation of the turn-over mechanism and comprises a bracket 195 having a portion 196 engaging into a recess formed in the piston rod 185. The bracket 195 has a clamping portion 197 shaped to engage the upper concave surface of a bearing 111 and to retain the same firmly clamped against the cradle portion 191 of the member 190 previously described. Air is admitted through the conduits 186 and 187 in timed relation by means of controls, which will subsequently be described. In the mechanical operation, however, the clamping element 197 is brought down to clamp a bearing liner 11 and the clamping element 197 is retained in clamping position during rotation of the turn-over mechanism through 180°. In Figure 14 the bearing locator 12 is shown as mounted on the slide 13, which is slidable on a stationary rod 13a carried by the machine. The turn-over mechanism inverts the bearing at a time when the bearing locator 12 is directly therebeneath, with the result that the bearing liner 11 is positioned directly over the bearing locator 12. At this time, by means of the controls later to be described, air is reversed in the cylinder 184, moving the piston 185 in the opposite direction and releasing the clamping element 197. This permits the bearing to be accurately located within the bearing locator for subsequent operation.

Figure 12:
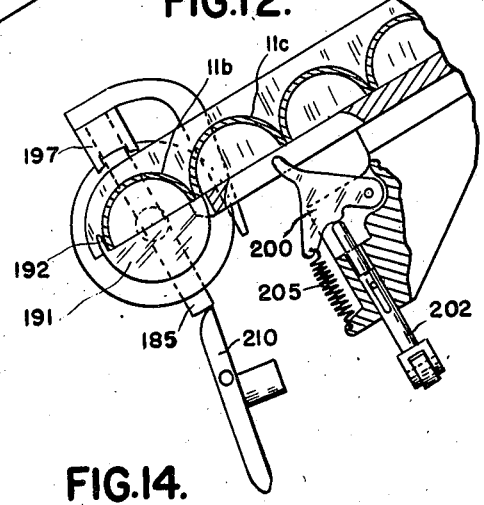
Figures 11 and 12 are views similar to Figure 10, showing the parts in successive operating position.
Figure 11:
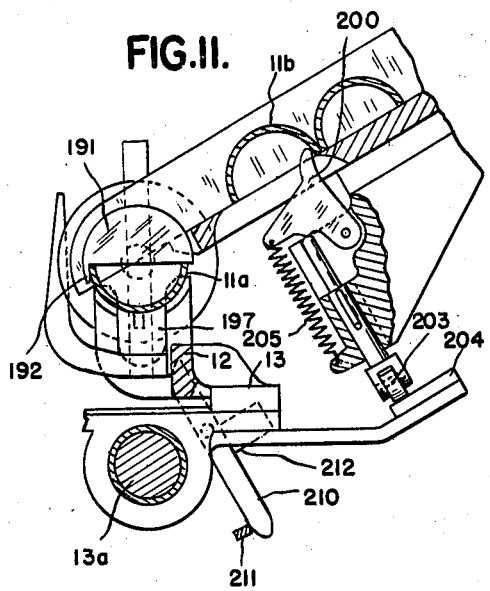

Figures 10, 11 and 12 show succeeding steps in the operation of the mechanism thus far described. In Figure 10 a bearing 11a is in position on the cradle portion 191 of the member 190 and is retained in this position by the clamping element 197. Meanwhile a pivoted finger 200, working in a slot 201 provided in the floor 180 of the chute 10, has engaged the next succeeding bearing 11b and has moved the whole series of bearings in the chute upwardly so as to prevent the bearings from continuing down the chute and interfering with the bearing being inverted. The finger 200 is operated by means of a plunger 202 terminating in a roller 203 which is engaged by a camming member 204 carried by the slide 13. The finger 200 is biased in a direction out of engagement with the series of bearings by means of a tension spring 205.

Means are provided for preventing downward movement of the clamping element 197, except when a bearing is to be inverted. This means takes the form of a stop 210 pivoted to the frame of the machine and adapted to engage the lower end of the piston rod 185.

The stop 210 is adapted to be positioned by a camming member 211, movable with the slide 13, and best illustrated in Figure 1. The stop 210 is biased in a direction to prevent downward movement of the piston rod 185 by means of a weight 212, and is moved to clearance position as indicated in Figure 10 when the slide 13 is in the right-hand position. Figure 12 shows the stop 210 in operative position engaged by piston 185.

Figure 11 illustrates the next step in the operation of the turn-over mechanism, and it will be observed that the entire turn-over mechanism has been inverted substantially 180°, or sufficient to invert the bearing directly over the locator 12. As shown in this figure, the clamping element 197 is still engaging the bearing 11a and is retaining the same against the semicylindrical cradle portion 191 of the member 190. The stop finger 200 is retaining the next succeeding bearing 11b from downward movement into contact with the turn-over mechanism. At this time, through the pneumatic controls later to be described in detail, the clamping element 197 is moved down out of contact with the bearing 11a, thus depositing the bearing 11a in accurately located position in the locator.

In Figure 12 a later step in the operation is illustrated, and at this time the stop 210 is shown as in position to engage the piston rod 185 and to prevent downward movement of the clamping element 197. Also at this time the camming surface 204 has been withdrawn from the plunger 202 and the finger 200 is withdrawn from the path of advance of the bearing members by the tension spring 205. Accordingly, the next succeeding bearing 11b will move downwardly until its motion is arrested by the finger 192. The following step in the operation, which is not illustrated, will be clockwise movement of the finger 200, withdrawing the next succeeding bearing 11c out of position over a half-round cradle portion 191 of the member 190, camming of the stop 210 out of engagement with the piston rod 185, and downward movement of the piston rod 185 to bring the clamping element 197 into engagement with the bearing 11b. These operations will result in the parts assuming the position of Figure 10, thus completing a cycle.

The transfer mechanism comprises broadly the bearing locator 12 from which an unfinished bearing is transferred to the bearing die in the interior of the machine, the transfer yoke 16 which effects the transfer of the unfinished bearing from the bearing locator 12 to the bearing die, and also effects the transfer of the completed bearing from the bearing die to the bearing receiver 20. The bearing locator 12 and the bearing receiver 20 are both mounted on the slide 13 and are adapted to be reciprocated back and forth in timed relation to rotation of the yoke 16. The yoke 16 and its associated mechanism is best illustrated in Figure 21, the yoke being indicated in full lines in lowermost position in this figure, and being indicated in dotted lines in upper position in this figure.

The yoke 16 is raised and lowered by means of a pneumatic cylinder 220 containing a piston (not shown) carrying a connecting rod 221 secured to the yoke 16 by means which will be described in detail. The yoke 16 has connected thereto a drawbar 222, and a bolt 223 connects the drawbar to the connecting rod 221. In order to prevent disconnection between the connecting rod 221 and the drawbar 222 by unscrewing of the bolt 223 during operation of the machine, a collar 224 is fastened to the lower end of the connecting rod 221 by a set screw 225, and the collar 224 carries a depending pin 226 which rests upon the upper end of the drawbar 222. A second stop pin 227 is set into the upper surface of the drawbar at the same radial distance as the pin 226, so that relative rotation between these parts is limited to substantially 180° by engagement of the pins 226 and 227. Initial connection between the two is established before the collar 224 is locked in position by the set screw 225.

The yoke 16 has an upstanding collar portion 230, and intermediate bushings 231 are provided intermediate the collar 230 and column 232. The column 232 is provided with diametrically opposite slots indicated at 233, and a driving pin 234 extends diametrically across the collar 231 and passes through the slots 233. Guide blocks 235 are carried by driving pin 234 and fit within the elongated slots 233.

Secured to the lower end of the column 232 is a gear 240 which is adapted to rotate the column 232 and the yoke 16. Rotation is imparted to the gear 240 by means of a rack 241 which, in turn, is reciprocated by reciprocation of the slide 13 through arm 318. This results in timed rotation of the yoke 16 in relation to reciprocation of the crosshead 18 and slide 13, as will be readily apparent. A guide 242 is carried by the frame of the machine and is adapted to be engaged by a follower 243 carried by one arm of the yoke 16, so as to insure accurate registry of the pick-up mechanism at the end of the yoke arm when the same is lowered into engagement with a bearing contained in the bearing locator.

The yoke 16 terminates at its opposite ends in pick-up devices 17 which include portions adapted to fit within the concave bearing liners and spring pressed fingers 245 which are adapted to snap over the lower edge of the bearing. The structure of these parts will later be described in detail.

The operation of the yoke and its associated mechanism, which together make up the transfer mechanism, will now be described in a sequence:

Assume that the yoke is in the uppermost position indicated in dotted line in Figure 21 and that an unfinished bearing has been positioned in the bearing locator 12. Air is now admitted to the upper end of the cylinder 220 and the yoke descends on what will be termed a pick-up stroke. Since a bearing is properly positioned in the locator the pick-up device will engage the bearing and the spring fingers 245 will snap over the lower edge of the bearing, thus retaining the same on the device 17. The yoke then rises to the top of the stroke and is rotated through 180°, thus positioning the unfinished bearing directly over the bearing die 40. Air is admitted to the top of the cylinder 220 and the yoke 16 descends on a deposit stroke, positioning the unfinished bearing accurately in the bearing die 40. At the lower end of the stroke, air is admitted to actuate the plunger 246, previously referred to, in a manner to force the spring fingers 245 apart so as to release the bearing. The yoke 16 then rises to the dotted line position of Figure 6. A cutting stroke is made by the broaching means and concurrently therewith the yoke reversely rotates through 180° while at the top of its stroke. Meanwhile, a new unfinished bearing has been positioned in the bearing locator by the means previously described, and the yoke 16 again descends on a second pick-up stroke. At this stroke the pick-up devices, at both ends of the yoke 16, operate to engage the bearing in the bearing die and in the bearing locator, and the yoke again rises to uppermost position. It is again rotated through 180° to position the unfinished bearing over the bearing die and to position the finished bearing over the bearing receiver 20, which has now been shifted to position to receive the finished bearing. The yoke 16 again descends on a second depositing stroke, depositing the unfinished bearing in the die 40 and depositing the finished bearing in the bearing receiver 20.

When the unfinished bearing is located in the bearing die, it is rigidly clamped in position therein prior to the broaching stroke of the crosshead 18 by means of clamps 250 terminating at their upper ends in clamping fingers 251. The clamps 250 are partially supported by bolts 252, having heads 253 extending through slots 254 in clamping members 250. An air cylinder 255 is provided, which is connected to the clamps 250 through the medium of a cross arm 256 connected to the piston of the cylinder 255 by means of a connecting rod 257 having a bifurcated upper end 258. Means are provided for insuring simultaneous actuation of the clamps 250, and this means takes the form of an equalizer yoke 259 pivoted as indicated at 260 to the frame of the machine and having a pair of forwardly extending arms having rounded portions 261 received within slots 262 of the cross arm 256. The yoke is best seen in Figure 9, and the cross arm 256 is best illustrated in Figure 21. The lower ends of the clamping bars 250 are connected together by tension spring 263 which tends to swing the upper end of the clamping bars outwardly. This is assisted by springs 264 seated on the top of the cross bar 256 and received within cup-like projections 265 on the clamping bars 250.

When air is admitted to the upper end of the clamping cylinder 255, the cross bar 256 is moved downwardly, and the upper ends of the clamping bars 250 are cammed inwardly by reason of camming surfaces 267 formed on the clamping fingers 251 previously referred to.

As best seen in Figures 1 and 2, the bearing receiver 20 is pivoted to the slide 13 as indicated at 270 and has an arm 271 extending therefrom, carrying a weight 272 which urges the receiver 20 in a counterclockwise direction to the position indicated in Figure 2.

During reciprocation of the slide 13, the bearing receiver 20 is maintained by suitable camming means in the position shown in Figure 1, and it is only when the slide 13 moves to the extreme left position, as shown in these figures, that the bearing receiver 20 is permitted to rotate in counterclockwise direction by reason of the counterweight 272. When the bearing receiver 20 tips to the position shown in Figure 2, the finished bearing slides downwardly thereon and is deposited on a pivoted piler 274. This piler has a lever 275 extending therefrom, connected by a link 276 to the crank 277 which is operated from the cam at the rear of the machine, as will be described. Movement of the slide 13 to the right to the position shown in Figure 1 results in a tipping of the piler 274 to the position shown in Figure 1 which results in dropping the bearing on the table 21 in partially nested relation with previously finished bearings, and pushing the stack or pile of bearings along the table sufficient to accommodate the last finished bearing.

The foregoing description has described the mechanism which advances a bearing from the chute 10 to the machine and deposits it in finally finished condition on the table 21. The operation of the mechanism thus far described is fully automatic, and it is only necessary for the operator to keep a supply of bearings in the chute 10 and to remove the accumulation of completed bearings from the table 21.

*Mechanical movement of parts*

The prime mover of the machine is the motor 35 which, through the medium of the double reversible worm gear connection, results in reciprocation of the crosshead 18. A number of other moving parts are mechanically actuated by movement of the crosshead, as will now be described.

Referring first to Figure 4, a cam plate 300 is mounted on the frame 30 for longitudinal reciprocation, the cam plate 300 having rollers indicated at 301 and 302 which engage in a slot 303 provided in the frame. The cam plate 300 has an inclined slot 304 provided therein, terminating at its ends in horizontal portions 305 and 306. Movement is imparted to the cam plate by means of an arm 307 projecting from tool carriage 18a, as shown at the left in Figure 21. Mounted on the base of the frame 30 is a transverse shaft indicated at 310, which has keyed or otherwise secured adjacent the rear end thereof a lever 311 which is connected by means of a link 312 to a cam follower 313 received within the slot 304. Reciprocation of the tool carriage 18a transmits similar reciprocatory motion to the cam plate 300 through the medium of the arm 307, and this results in vertical movement of the cam follower 313, the link 312 being retained against longitudinal movement by a bracket indicated at 314. This movement of the cam follower 313 results in oscillation of the shaft 310.

At the front of the machine, as best illustrated in Figure 1, the shaft 310 has secured thereto a short lever arm 277, previously referred to, which is connected to the slide 13 through the medium of a link 315, the link being provided for the purpose of changing the oscillating motion of the lever 277 in direct linear motion of the slide 13. The motion of the slide 13 is between limits such that the bearing locator 12 previously referred to may be aligned with the yoke 16 in one extreme position of the slide, and will be aligned with the turn-over device 12 including the cradle 191 at the other extreme position. When the bearing locator is aligned with the cradle 191 the bearing receiver 20 is aligned with the yoke 16 in order to receive a finished bearing therefrom.

The slide 13 is provided with an upwardly projecting arm 318 (Figures 1, 2 and 4) which engages with the rack 241 previously referred to. It will be recalled that the rack 241 meshes with the gear 240 which is connected to the column which supports the yoke 16. Accordingly, as the slide 13 is reciprocated, rotation is imparted to the yoke and the parts are constructed and arranged such that the yoke is rotated through an arc of 180° while the slide 13 moves from one limiting position to the other.

Reciprocation of the crosshead 18 also results in movement of a control bar 320, whose function will later be described in conjunction with the pneumatic system. Suffice it to say for the present that the control bar 320 is provided with semicircular ends 321 which are adapted to be abutted alternately by either end of the crosshead 18 as it moves to limiting position. Other means later to be described are provided for moving the control bar away from the crosshead 18 while the same is at rest.

Means previously described are provided for raising and lowering the yoke 16 and also for rotating the same through an arc of 180° while the yoke is in elevated position. The arms of yoke 16, as best seen in Figures 20 and 21 are provided with openings 325. At the side of the column 232 is mounted a short rack section 326, which is meshed with a pinion 327. The pinion 327 is connected with a shaft 328, shown in Figure 3, which, in turn, is geared to the casting 182 of the turn-over device 14 by gears indicated generally at 328a.

In Figure 21 I have indicated the rack 326 in depressed position and I have shown an abutment 329 carried by one of the arms of the yoke 16. It will be noted that a similar abutment is not provided at the other opening 325 so that the rack 326 will be depressed only on alternate downward strokes of the yoke.

A housing bracket 330 is provided for receiving the rack 326 in upper position and suitable means, such for example as a spring, are provided for returning the rack to upper position on upward movement of the yoke. It will be appreciated that the openings 325 are provided in both arms of the yoke for the purpose of clearing the rack housing 330. In Figure 2, the rack 326 and the housing 330 are both shown as extending upwardly through the right-hand arm of the yoke 16.

*Sequence of mechanical movement*

Before describing the pneumatic system which controls the apparatus, the sequence of mechanical movement will be briefly reviewed. As a starting position, it is assumed that the yoke is in uppermost position and that it has a finished bearing in the outboard pick-up device and an unfinished bearing in the inboard pick-up device. The slide 13 is in right-hand position so that the bearing locator 12 is beneath the cradle 191 and the bearing receiver 20 is in line with the transfer mechanism 15 including the yoke 16.

The yoke 16 now moves downwardly, downward movement of the yoke actuating the rack 326 and rotating the cradle 191 through gears 328a, thus inverting an unfinished bearing and positioning the same directly above the bearing locator 12. The bearing is deposited in the bearing die 40 in the interior of the machine, and a finished bearing is simultaneously deposited on the bearing receiver 20. The bearing carried by the cradle 191 is deposited in the bearing locator and the yoke moves upwardly.

Upward movement of the yoke permits the cradle 191 to return to its initial position so as to receive a succeeding bearing. When the yoke 16 reaches uppermost position, the clamping cylinder 255 is energized and the clamping elements 251 are brought into tight clamping engagement with the unfinished bearing in the bearing die. Following this, the appropriate clutch of the driving mechanism is energized and the crosshead 18 is moved to the right in a cutting stroke, thus broaching the bearing to accurate size. Movement of the crosshead to the right eventually engages the right-hand end of the control bar 321 and moves the same to neutral position, performing a function in the automatic control system which will later be described.

Translation of the crosshead 18 to the right results in an opposite translation of the slide 13 to the left, moving the bearing receiver 20 adjacent the piler mechanism 274 and depositing the finished bearing thereon. Movement of the slide 13 to the left is arrested when the bearing locator 12 is accurately aligned with the transfer mechanism 15. Movement of the slide 13 to the left operates the rack 241 and rotates the yoke 16 through 180°, thus positioning the yoke for the succeeding pick-up stroke.

The yoke now descends, but the rack 326 is not actuated at this time since the actuating lug 329 will be located on the inboard arm of the yoke. The pick-up devices 17 of the yoke arms come into contact with the finished bearing in the bearing die 40 and the unfinished bearing in the bearing locator 12, and the spring fingers in the pick-up device latch the bearings to the pick-up devices.

The yoke 16 now rises to uppermost position, and upon reaching uppermost position the opposite clutch of the driving mechanism is energized, thus reversely reciprocating the crosshead 18. This reverse reciprocation of the crosshead 18 results in an opposite movement of the slide 13 to a position where the bearing receiver 20 is positioned opposite the transfer mechanism 15, and the bearing locator 12 is positioned under the cradle 191. Yoke 16 is also reversely rotated through 180° by gear 240. As the crosshead 18 completes its reverse movement it again moves the control bar 321 to intermediate position, as will later be described in detail. The yoke 16 now descends on a depositing stroke and the spring catches of the pick-up device are pneumatically released, thus depositing an unfinished bearing in the bearing die 40 and a completed bearing in the bearing receiver 20. At this time downward movement of the yoke actuates the rack 326 and operates the turn-over mechanism 14, which results in depositing another unfinished bearing in the bearing locator 12. Upward movement of the yoke 16 completes the cycle and restores the parts to the condition assumed initially.

*Bearing locator pick-up device and air release*

Referring to Figures 17, 18 and 19, I have illustrated in detail the bearing locator which receives the bearing liners from the loading chute, a pick-up device for picking the bearing out of the bearing locator for transfer to the bearing die, and the pneumatic release which operates the stripping levers of the pick-up device.

In Figure 18 the bearing locator 12 is shown in section as comprising a main portion 510 rigidly mounted on the base 511 which is secured to the slide 13 previously referred to. The bearing locator comprises essentially a pair of cooperating webs 512 and 513 having their upper portions shaped as indicated generally at 514 for receiving a bearing liner in proper position for transfer to the bearing die. The web 513 is pivoted as indicated at 516 to the main portion 510. A tension spring 517 interconnects the two portions and normally retains them in the position shown in Figure 18.

The purpose of this arrangement is to provide a safety feature which will prevent transfer of a bearing to the bearing die in the interior of the machine unless the bearing is of proper size and is properly positioned in the bearing locator. If it happens that the bearing is improperly positioned in the bearing locator 12 the pick-up device later to be described in detail will not register accurately with the bearing liner and will force the pivoted portion 513 of the locator outwardly, thus permitting the improperly positioned bearing liner to drop out.

In Figure 19 I have illustrated a pick-up device adapted to pick up a bearing out of the bearing locator 12 and transfer the same to the bearing die. The pick-up device is made up of an air cylinder 520 which is clamped in a sleeve portion 521 at the end of the yoke 16 previously described. The upper end of the cylinder 520 is tapped as indicated at 522 for connection to an air conduit. Mounted within the cylinder 520 is a piston 523 rigidly secured to a piston rod 524. The piston 523 is provided with peripheral notches as indicated at 525, permitting passage of air thereabout for a purpose which will presently appear. The lower end of the cylinder 520 is provided with diametrically opposite ears 526 and stripping levers 527 are pivoted thereto, slots being provided in the lower portion of the cylinder for receiving the stripping levers. An unloading shoe 528 is bolted or otherwise secured to the lower end of the cylinder and assembled therewith is a locator element 529 of a size adapted to fit accurately within the open side of a bearing liner. The unloading shoe 528 is provided with slots as shown for the reception of the stripping lever 527.

The piston rod 524 is provided with a transverse slot 530 adapted to receive rounded ends 531 of arms 532 formed on the stripping levers 527. The lower portion of the stripping levers 527 are provided with projections 533 adapted to be positioned beneath the bearing and to lock the same in position in the pick-up device as indicated in the figure. In this figure the bearing is shown at 11.

A compression spring 534 is located within the cylinder and urges the connecting rod 524 upwardly as shown. This tends to urge the lower ends of the stripping lever 527 resiliently inwardly in locking relation to the bearing. Air is admitted by means which will presently be described to the upper end of the cylinder over the piston 523, moving the same downwardly against the compression spring 534, thereby releasing the bearing liner element 11 contained therein. When air is cut off, spring 534 returns piston 523 upwardly, air escaping past grooves 525.

Means for controlling the admission of air to the cylinder 520 is shown in detail in Figure 17. In this figure I have indicated at 540 a portion of the frame of the machine shaped to provide an enlarged air chamber 541 which, in turn, is connected to a source of air through a conduit 542. A valve seat 543 is secured in closing relation at the upper end of the chamber 541 and a valve 544 is vertically slidable in the air chamber 541. The valve 544 is provided with a plurality of grooves 555 at its periphery which permit a flow of air past the valve when the same is in the position shown in Figure 17.

Normally the valve 544 is maintained in seated position against the valve seat 543 by compression spring 544a, at which time the upper end of the air chamber 541 is effectively sealed since the grooves 555, previously described, will be closed off at their upper ends at this time by the engagement between the valve 544 and the valve seat 543.

Over the air chamber 541 is an opening which is partially closed by an annular member 556 containing a sealing ring 557.

The pick-up devices shown in Figure 19 which are located at opposite ends of the yoke 16 previously described, are connected to an air supply conduit which communicates with a nipple 485 carried by the yoke 16. The opening 486 in the frame which contains the sealing ring 557 is adapted to receive the nipple 485 when the yoke 16 moves downwardly into conjunction with the frame. As will subsequently be described, the nipple 485, being mounted eccentrically of the yoke, enters the opening 486 only on alternate down strokes of the yoke, these strokes being the so-called deposit strokes.

As will be apparent from Figure 17, the air chamber 541 is sufficiently large to hold a substantial charge of air under pressure. When the nipple 485 enters the opening 486 and moves the valve 544 away from the valve seat 543 the accumulated air in the chamber 541 flows through the grooves 555 and out an opening 560 through the nipple 485. This air is led by suitable conduits to the cylinder 520 of the pick-up devices, moving the piston downwardly in a manner to release the stripping levers 527.

*Pneumatic control system*

Figure 15:
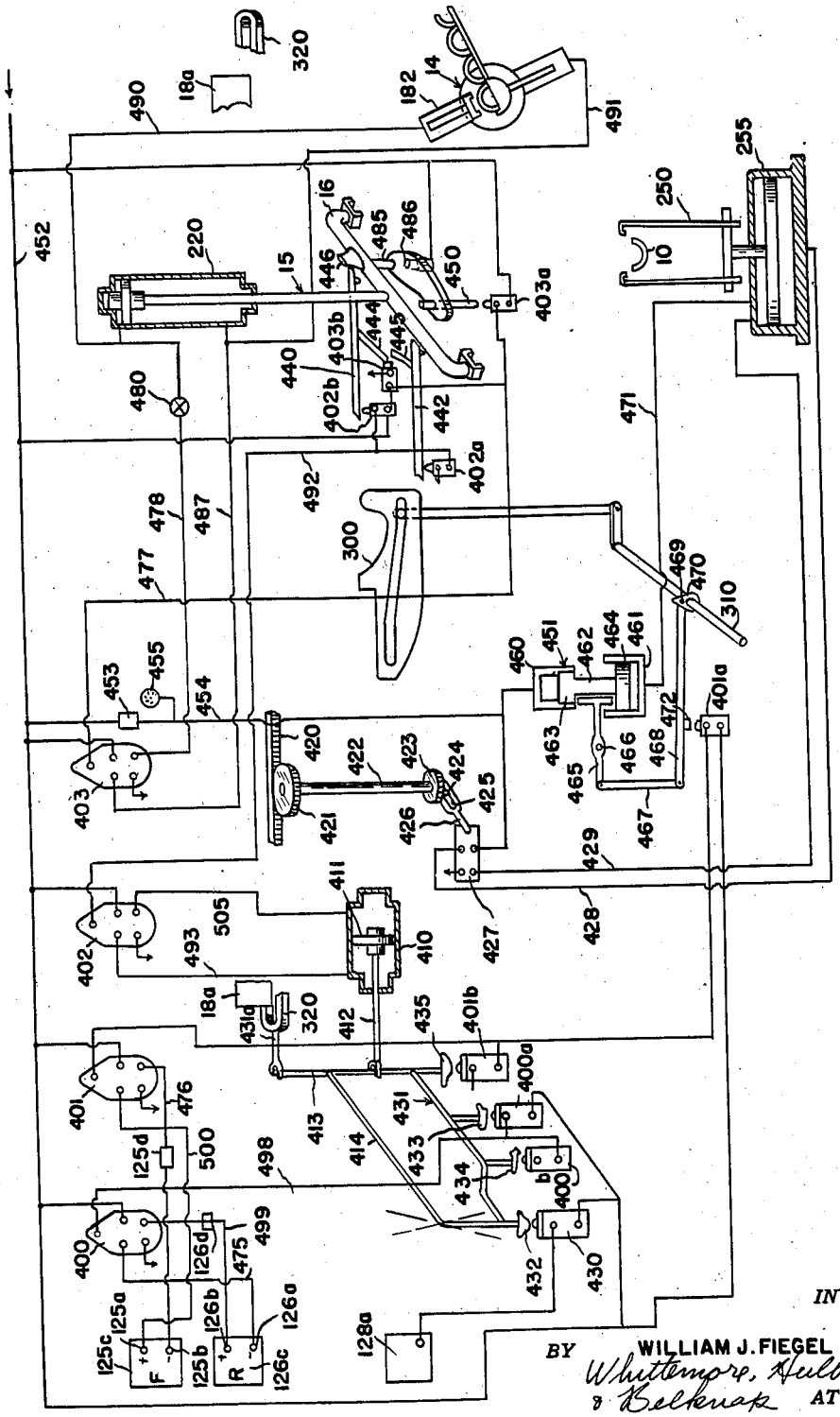
Figure 15 is a control circuit diagram, including some of the operating elements.

In Figure 15 I have diagrammatically illustrated the pneumatic control system and have indicated such parts of the machine as enter into the control.

In the pneumatic control system I employ a plurality of reversing valves, each of which is controlled by a pair of pilot valves connected as indicated in Figure 16. In this figure I have shown the reversing valve 350 having an air inlet port 351, and air outlet ports 352 and 353 connected to outlet lines 354 and 355, respectively. The port 356 is connected to an exhaust line 357. Pilots 360 and 361 are connected as shown. The pilot 360 has a port 362 which is connected to the main air line 364 by a line 363 and has an outlet port 365 connected to an outlet line 366. The line 366 is connected by a line 367 to a control port 368 of the reversing valve 350. The line 366 also connects to an inlet port 369 of the pilot valve 361. The pilot valve 360 has an exhaust port 370 connected to an exhaust line 371.

This pneumatic system is one which is known to the art as a Ross system, and the reversing valve 350 is arranged such that when line pressure is admitted to the control port 368 a connection is made between the inlet port 351 and the outlet port 352. When the air pressure applied through the port 368 is released, the valve 350 reverses and the inlet port 351 is connected to the outlet port 353. When the inlet port 351 is connected to the outlet port 352 the other outlet port 353 is connected to the exhaust port 356.

In like manner when the inlet port 351 is connected to the outlet port 353, the other outlet port 352 is connected to the exhaust port 356.

The pilots 360 and 361 are provided with actuating buttons 372 and are so arranged that when the button 372 is depressed, the ports 362 and 365 in the one case, or 369 and 371 in the other case, are directly connected. The valves contained within the pilots 360 and 361 are retained closed by spring pressure, except when mechanically opened.

If the actuating button 362 of the pilot 360 is depressed, air is admitted through the lines 363, 366 and 367 to the control port 368 of the reversing valve 350, thus connecting the inlet port 351 of the reversing valve with the outlet port 352, and connecting the other outlet port 353 of the reversing valve with the exhaust port 356. When the button 372 of the pilot 360 is released, the air in the lines 366 and 367 is trapped and the reversing valve remains in the position just described. However, when the button 372 of the other pilot valve is depressed, the air trapped within the line 367 is released through the pilot 361 via the outlet port 370. This relieves the pressure on the control port 368 of the reversing valve and the valve reverses, connecting the inlet port with the outlet port 353, and connecting the other outlet port 352 to the exhaust port 356. When the button 372 of the pilot valve 361 is released, the reversing valve 350 remains in the position just described until the next actuation of the control button of the other pilot valve 360.

Referring again to Figure 15, I have illustrated four reversing valves, 400, 401, 402 and 403. Each reversing valve has a pair of pilot valves which are designated at 400a, 400b, 401a, 401b, 402a, 402b, 403a and 403b. The reversing valve 400 is connected to the reverse clutch 126 which, when energized, causes the crosshead 18 to move to the left on an idle stroke. The reversing valve 401 is connected to the forward clutch 125 which, when energized, causes the crosshead 18 to move to the right on a cutting stroke. The reversing valve 402 is connected to an air cylinder 410, having a piston 411 connected by a connecting rod 412 to a lever 413, which is pivoted as indicated at 414. The function of the lever 413 will be fully described later. The reversing valve 403 is connected to the cylinder 220, which effects raising and lowering of the yoke 16.

The control bar 320 has a rack portion 420 engaging a gear 421 connected to a shaft 422, terminating in a control disc 423 having a depending finger 424 received within an open-ended slot 425 of an actuating lever 426. The lever 426 operates a reversing valve 427 having outlet lines 428 and 429 connected to opposite sides of the clamping cylinder 255 for actuation of the clamping members 250.

The control bar 320 has three operative positions, namely, an intermediate neutral position and two extreme positions which actuate controls, as will subsequently be described. The slot 425 of the actuating lever 426 is open at its outboard end, and the finger 424 is adapted to swing the lever in a manner to operate the reversing valve 427 when the control bar moves from its intermediate to its left-hand position, or vice versa. When the control bar moves from its intermediate position to its right-hand position, or vice versa, the finger 424 moves out of the slot 425 and the lever 426 remains in the position shown until the control bar again moves from intermediate to left-hand position. A control valve 430 is provided, which is adapted to supply air to the brake cylinder 128a, to apply the brake.

The valves 430, 400a, 400b and 401b are adapted to be controlled by camming shoes carried by a frame 431 which is pivoted about the axis 414 as seen in Figure 6. Frame 431 is positively connected to the control bar 320 by link 431a and accordingly assumes three positions corresponding to the neutral and the two extreme positions of the control bar previously referred to. The valve 430 is actuated by a cam 432 which is adapted to operate the valve 430 only when the control bar is in intermediate or neutral position. The valve 400a is operated by a cam 433 which is adapted to maintain the button of the valve 400a depressed except when the control bar is in right-hand position. The valve 400b is operated by a cam 434 which is adapted to depress the button of the valve 400b only when the control bar 320 is in the extreme right-hand position. The valve 401b is operated by a cam 435 which is adapted to maintain the button of the valve depressed except when the control bar is in the extreme left-hand position.

The pilots 402a, 402b and 403b are adapted to be actuated by the yoke 16 in a manner which will now be described. Referring to Figure 20, the structure diagrammatically illustrated in Figure 15 is shown in detail. A lever 440 is supported by a pin 441 for a rocking movement about a horizontal axis, and is also supported for sliding movement to the right and left as seen in Figure 20. A similar lever 442 is mounted on a pin 443 for sliding movement to the right and left and for rocking movement about the pin 443 as shown in Figure 20. The lever 440 overlies the pilot 402b, and when the lever is rocked it is adapted to actuate the valve 402b. The lever 440 has a projecting arm 444 which is located adjacent the control button of the valve 403b and when the lever 444 is moved to the left it actuates the pilot 403b. In like manner the lever 442 is provided with an arm 445 adapted to actuate the pilot 403b when the lever 442 is moved to the left as seen in Figure 20, and is also adapted to actuate pilot 402a when the lever 442 is rocked about the axis of pin 443.

The levers 440 and 442 are controlled by movement of the yoke 16, the arrangement being such that when the yoke 16 moves to uppermost position an abutment indicated at 446 (Figure 15) is adapted to engage one of the levers, 440 or 442, and to actuate one of the valves 402b or 402a, respectively. When the yoke is in uppermost position and is rotated through 180°, as previously described, the abutment 446 is adapted to engage the end of one of the levers 440 or 442 and to move the same to the left as seen in Figure 15. Movement of either lever 440 or 442 to the left will actuate the pilot 403b.

The pilot 403a is adapted to be actuated upon completion of the downward movement of the yoke 16 through a plunger 450 which is engaged by the yoke 16 upon each downward movement thereof.

The remaining pilot 401a is adapted to be actuated by a compensating cylinder 451, which will now be described.

The pressure applied to the clamping cylinder 255 is carefully controlled in order that the clamping pressure applied to the bearing liners 11 in the die will be uniform. It is essential that the bearing shall be clamped in the die by the clamping members 250 before the broaching operation takes place, and, accordingly, I have provided means to accomplish this result. In Figure 15 the main air line is indicated at 452, and at 453 I have indicated a reducing valve so that the air pressure in the line 454 shall be constant, irrespective of the higher pressure obtaining in the main air line 452. The pressure in the air line 454 is indicated by the pressure gauge 455. The control valve 427 is adapted to connect the controlled air line 454 with the lines 428 or 429 which connect, respectively, to the bottom and top of the clamping cylinder 255. The compensating cylinder 451 has an upper cylinder 460 of relatively small diameter and a lower cylinder 461 of relatively large diameter. A compound piston 462 having an upper relatively small piston portion 462 and a relatively larger lower piston portion 464 is provided in the cylinders. Air under the controlled pressure from line 454 is constantly admitted to the upper cylinder 460, and normally retains the piston 462 in lowermost position. A lever 465 is pivoted as indicated at 466 and is connected by a link 467 to a second lever 468. The lever 468 is pivoted as indicated at 469 from a short crank arm 470 carried by the cross shaft 310, which is rocked as previously indicated by means of the cam 300. The lever 468 has an abutment 472 which is adapted to engage the control button of the pilot 401a.

With the parts in the position shown in Figure 15, the arrangement is such that when the valve 427 is actuated to admit controlled air to the upper portion of the clamping cylinder 255, this air pressure is supplied in the lower cylinder 461 through a line 471. This pressure will gradually build up to the controlled pressure as controlled by the setting of the reducing valve 453. Since the lower piston portion 464 is larger than the upper piston portion 463, eventually the piston 462 will move upwardly, thus rocking the lever 468 downwardly about its piston connection 469 and actuating the pilot 401a. This initiates a step in the operation which results in a rocking of the cross shaft 310, as will later be described, and moves the projection 472 out of line with the button of the pilot 401a.

The operation of the machine is started and stopped by a manual valve 480 which controls the admission of air to the cylinder 220.

*Operation*

The mechanical structure and the air systems have now been described and it remains only to describe the cooperation between the two, which may best be accomplished by running through the complete operation of the machine.

It is assumed initially that the crosshead 18 is to the left. The control bar 320 is in intermediate or neutral position so that its left-hand end is in abutment with the left-hand end of the crosshead 18 as shown in Figure 15. The yoke 16 is in uppermost position, ready to move downwardly on a deposit stroke and bearings are held within the pick-up mechanisms on each arm thereof. The slide 13 is in right-hand position so that the bearing locator 12 is beneath the cradle of the turn-over mechanism 14 (see Figure 1), and the bearing receiver 20 is in line with the yoke 16 directly beneath one of the pick-up mechanisms thereof. The valve 480 is closed so that no air pressure is admitted to the cylinder 220. The piston 411 of the cylinder 410 is in intermediate position and pilot valves 430, 400a, 401b and 403b are actuated.

Actuation of the valve 430 is admitting air to the brake cylinder 128a, keeping the brake applied, so that the drive worms 132 are both idle. Actuation of the pilot 400a is admitting air to the control port 400 which admits air through the line 475 to the "off" port 126a of the reverse clutch cylinder 126c, keeping the reverse clutch deenergized. Actuation of the pilot 401b has released air from the control port of the reversing valve 401 and is admitting air through the line 476 to the "off" port 125b of the forward clutch cylinder 125c, keeping the clutch deenergized. Actuation of the pilot valve 403b releases air through the line 477 from the control port of the reversing valve 403 and admits air through the line 478 to the manual valve 480.

When the manual valve 480 is opened, line air is admitted through the line 478 to the upper end of the cylinder 220, thus moving the yoke downwardly. Air is at the same time admitted to turn-over casting 182 to clamp a bearing liner in the cradle.

Downward movement of the yoke at this time operates the turn-over mechanism 14 through the medium of the rack 326 previously described. When the yoke 16 reaches downward position the nipple 485 enters the opening 486 and air is admitted to operate the piston 523 which releases the stripping levers 527 (see Figure 19). The unfinished bearing is thereby deposited in the bearing die and the finished bearing is thereby deposited in the bearing receiver 20. Simultaneously, completion of the downward deposit stroke of the yoke 16 actuates the pilot 403a which admits air through the line 477 to the control port of the reversing valve 403. This connects the main air line 452 through the line 487 to the bottom side of the cylinder 220, thus causing the yoke 16 to move to the uppermost position. Air is simultaneously reversed in the cylinder of turn-over casting 182, depositing a bearing liner in bearing locator 12.

It should be noted that air lines 490 and 491 are connected to the clamping device of the turn-over mechanism 14 and that these air lines are in parallel with the lines 478 and 487 which control vertical movement of the yoke. The arrangement is such that when air is admitted to the top of the cylinder 220, air is likewise admitted to operate the clamping member 197 (see Figures 10 to 14), and when air is admitted through the line 487 to raise the yoke 16, the air is likewise admitted through the line 491 to operate the clamp of the turn-over mechanism in a direction to release the same.

As the yoke 16 completes its upward stroke the abutment 446 carried thereby strikes the pivot lever 440 and actuates pilot 402b. Actuation of the pilot 402b admits line air through the line 492 to the control port of the reversing valve 402, thereby connecting the main air line 452 through the line 493 to the left-hand end of the cylinder 410. This moves control bar 320 to the left and swings the cam frame 431 in a counterclockwise direction as seen in Figure 15, which has the following effect:

The cam 432 is removed from the button of the valve 430, thus releasing air from the brake cylinder 128a. The cam 435 moves out of contact with the button of the lever 401b, thus setting up later actuation of pilot 401a. Motion of the control bar 320 to the left actuates valve 427 through pinion 421 and lever 426, admitting controlled air from the line 454 to the upper end of clamping cylinder 225 through line 429.

As the pressure in the upper end of cylinder 255 builds up to the required amount, the piston 462 of compensating cylinder 451 moves up, actuating pilot valve 401a through lever 468. This admits air to the control port of reversing valve 401, which admits line air to "on" port 125a and the forward clutch cylinder 125c. This engages the sheave of the forward driving worm to its shaft, and drives the crosshead to the right on a cutting stroke.

Movement of the tool carriage 18a to the right has a number of effects: First, it rocks shaft 310 through cam 300 so as to move abutment 472 laterally away from the button of pilot valve 401a. Secondly, it moves slide 13 to the left through lever 277 and link 315 (see Figure 9), thus positioning the bearing locator 12 in line with transfer mechanism 15, or more specifically, in line with the pick-up mechanism of yoke 16. Motion of slide 13 to the left rotates yoke 16 clockwise as viewed from above through 180° by means of rack 241 and gear 240 (Figure 21). Motion of the carriage 18a also engages the right-hand end of control bar 320 and shifts it to intermediate position.

It will be noted that control bar 320 has clearance with respect to the ends of tool carriage 18a, this clearance being sufficient so that as the carriage 18a reaches either limiting position, the control bar 320 is moved to intermediate or neutral position.

Rotation of yoke 16 as just described results in actuation of pilot 403b, this time through lever 442 and arm 445.

Motion of the control bar 320 from left position to neutral as just described, rocks frame 431 clockwise in Figure 15 and actuates valve 430 and pilot 401b. Actuation of valve 430 applies the brake 128 by admitting air to cylinder 128a. Actuation of pilot 401b releases air from the control port of valve 401, reversing the air on forward clutch cylinder 125c by applying line air to the "off" port 125b through line 476, thereby releasing the clutch. Cams 432 and 435 are proportioned such that the clutch is released just prior to application of the brake.

Motion of control bar 320 to neutral reverses valve 427, reversing the air on clamping cylinder by connecting line 428 to exhaust, and line 429 to the controlled pressure line 454. When the upper end of clamping cylinder 255 is connected to exhaust, pressure is thereby released from piston 461, and since controlled pressure is constantly admitted to smaller cylinder 460, piston 462 moves downwardly, raising lever 468 about pivot connection 459.

Actuation of the pilot 403b as just mentioned releases air from the control port of valve 403, and valve 403 reverses, connecting the top of cylinder 220 to air line 452 through line 478.

This results in lowering of the yoke 16 on a pick-up stroke. The bearing locator 12 has an unfinished bearing liner therein in position to be picked up, and the finished bearing liner in the bearing die, having been released by clamps 250, is ready to be picked up.

Downward motion of yoke 16 at this time does not rotate turn-over mechanism 14 since on this stroke rack 326 (Figure 6) is not engaged by lug 329, which is on the inboard arm of yoke 16 on this stroke.

Air is admitted through line 490 to the cylinder 184 of the turn-over mechanism (see Figure 14) but the stop 219 (Figure 12) prevents hammering of the piston and clamp element 197 as previously described.

On this pick-up stroke the nipple 485 is out of registry with port 486, and accordingly as the pick-up devices engage the respective bearing liners, the liners are latched in place by the stripping levers 527.

At the bottom of the down-stroke, pilot 403a is again actuated, admitting line air to the control port of reversing valve 403. It connects the bottom of cylinder 220 to pressure through line 497, causing the yoke to rise.

When the yoke 16 reaches the top of the stroke, abutment 446 thereon strikes lever 442, rocking the same about pin 443 (see Figure 20) and tripping pilot 402a. Actuation of pilot 402b releases air pressure from control port of reversing valve 492, thereby connecting the right-hand end of cylinder 410 to air line 452 through line 505.

This results in rocking cam frame 431 in a clockwise direction about the pivot axis 414, moving the control bar to right, or reverse position. This releases valve 430, releases pilot valve 400a, and actuates pilot valve 400b. Release of valve 430 cuts off air from the brake air cylinder 128a, releasing the brake 128. Actuation of pilot valve 400b releases pressure from control port of reversing valve 400 through line 468, thereby applying air to the "on" port 126b of reverse clutch cylinder 126c through line 499.

This engages the reversing clutch and locks sheave 121 (Figure 5) to the shaft, thereby reversely driving worm 132 and returning tool carriage 18a to the left on an idle stroke.

Motion of the crosshead to the left has a number of results. First it rocks shaft 319 in a clockwise direction, positioning abutment 472 over pilot valve 401a preparatory to initiating a new cutting stroke. Secondly it moves slide 13 to the right, through lever 277 and link 315 (see Figure 1), thus positioning the bearing receiver 29 in line to receive a completed bearing from the pick-up device of yoke 16, and positioning bearing locator 12 in line with turn-over mechanism to receive a bearing liner therefrom.

Motion of slide 13 to the right rotates yoke 16 in a counterclockwise direction as viewed from above (Figure 20) through rack 241 and gear 240.

Motion of the carriage 18a to the left engages the left-hand end of the control bar 320 and moves it back to neutral.

Rotation of the yoke 16 as just described results in actuation of pilot 403b, this time through lever 440 and arm 444.

Movement of the control bar 320 from right position to intermediate position as just described rocks cam frame 431 counterclockwise in Figure 15, and actuates valve 430 and pilot 400a. Actuation of valve 430 admits air to brake cylinder 128a, applying the brake. Actuation of pilot 400a admits air pressure to the control port of reversing valve 400, thereby reversing the valve and admitting air to the "off" port 126a of the reversing clutch cylinder 126c through line 475. Cams 432 and 433 are proportioned such that the clutch is disengaged just prior to brake actuation.

Motion of the control bar 320 to neutral brings pin 424 back into open-ended slot 425 of lever 426, but does not operate reversing valve 427 at this time.

Actuation of the pilot 403b as last mentioned releases air from the control port of valve 403, through line 497, reversing the valve, and connecting the top of cylinder 220 to air through line 478.

This results in lowering of the yoke 16 on a second deposit stroke, thus completing the cycle.

A safety feature is inherent in the sequential controls employed.

Initiation of the up-stroke of yoke 16 depends upon full completion of the preceding down-stroke, so that if the down-stroke is prevented, the machine comes to rest.

Shifting of control bar 320 to forward or reverse position is dependent on full completion of rotation of yoke 16 into contact with levers 440 or 442, and if full rotation of the yoke is prevented, the machine comes to rest.

Initiation of the forward cutting stroke of carriage 18a depends upon attainment of full clamping pressure in cylinder 225, to actuate pilot 401a, and if this pressure is not attained, the machine comes to rest.

If desired the brake cylinder 128a and clutch cylinders 125c and 126c are arranged such that if for any reason the air supply should fail, both clutches are disengaged, and the brake applied, as an additional safety feature.

*Miscellaneous features*

The machine contains a number of miscellaneous features which are not properly classifiable under the headings previously given.

Reference is made to Figure 3 which illustrates a motor 570 having geared connections indicated at 571 to a pair of shafts 572. At the inboard ends of the shafts 572 are mounted a pair of brushes 573 which are positioned such that when the crosshead 18 is moved to the right position, the broaching tool carried thereby is brought into contact with the rotating brushes 573. These brushes are periodically given a slight oil treatment so that after each broaching cut the broaching tool is cleaned and lightly oiled by the rotating brushes.

Another feature of the machine which contributes to the substantially absolute accuracy of the machine is the fact that all of the moving parts are cushioned. The main drive, which is a reversible worm gear, employs clutches which are adapted to take up and transmit torque gradually so that no sudden jars are transmitted to the machine. The air cylinders are of a type which are provided with small, cushioning cylinders so that at the termination of the stroke the movement of the piston is brought to rest in a gradually controlled manner so as to avoid shocking or jarring the machine.

Another feature of the machine which appears clearly in conjunction with the description of the operation is the safety feature inherent in the type of control employed. This control involves a series of operations, many of which depend for their initiation upon proper and satisfactory completion of a preceding operation. Thus, in the event that through accident or mishandling something goes wrong with the machine, the machine automatically comes to rest without damage to any of the moving parts and cannot be restarted until the difficulty has been cured.

Another feature of considerable importance is the arrangement by means of which motion of the control bar 320 (Figure 15) to intermediate position from either limiting position is opposed by air pressure in cylinder 410. This results from the fact that air is reversed in cylinder 410 by the actuation of pilots 402a and 402b, which are tripped as the yoke 16 reaches the top of its up-stroke. The control bar, having been moved to one limiting position or the other by piston 411, continues to be biased in the same direction by air pressure in cylinder 410 while it is moved mechanically to intermediate position in an opposite direction as a result of mechanical engagement by tool carriage 18a. This insures that control bar 320 is not carried past intermediate position by inertia, and also to some extent cushions tool carriage 18a.

Reference was previously made to the fact that the machine was provided throughout with means for cushioning against mechanical jars which might disturb the arrangement of the machine.

Mention was also made of the fact that the clutches 125 and 126 were arranged to be engaged gradually.

Referring to Figure 15, I have indicated generally at 125d and 126d valves which will accomplish this result. The valves 125d and 126d are in the air lines which supply pressure to the cylinder 125c and 126c, respectively, to operate these cylinders in a direction to engage the respective clutches. The valves 125d and 126d are arranged to seat when air pressure is applied to their respective lines and are provided with metering ports to permit a gradually controlled flow of air past the valves when heated. When air pressure is reversed by reversal of the corresponding reversing valves 401 and 400, the valves unseat and permit substantially unrestricted flow of air thereabout, this flow of air being in a direction to disengage the respective clutches.

The result of this arrangement is that when air is admitted to engage the clutches, the flow of air is controlled in a manner to insure gradual engagement of the clutches without grabbing so as to avoid mechanical shocks and jars. However, when the flow of air is reversed in a direction to disengage the clutches, this flow of air is substantially unrestricted so that the clutches disengage substantially instantaneously.

While I have illustrated and described a practical and preferred embodiment of my invention, it will be understood that this detailed disclosure has been made solely to enable those skilled in the art to practice my invention in all of its numerous aspects, the scope of which is indicated by the appended claims.

What I claim as my invention is:

1. A bearing broaching machine comprising a frame, a bearing die on said frame, clamping means for engaging a bearing in said die, a broach carrier slidable on said frame, drive means for intermittently reciprocating said carrier, said drive means comprising a motor and constant velocity driving connections including nonpositive forward and reverse friction clutches, and control means for sequentially engaging and disengaging said clutches to effect translation of said broach carrier in opposite directions, said control means including means effective to provide gradual engagement of said clutches.

2. A bearing broaching machine comprising a frame, a bearing die on said frame, clamping means for engaging a bearing in said die, a broach carrier slidable on said frame, drive means for intermittently reciprocating said carrier, said drive means comprising a motor and constant velocity driving connections including nonpositive forward and reverse friction clutches and a brake, and control means for sequentially engaging and disengaging said clutches and brake to effect reciprocation of said broach carrier, said brake terminating translation of said broach carrier in each direction, thereby avoiding jarring engagement of said carrier with a positive stop.

3. A bearing broaching machine comprising a frame, a bearing die on said frame, clamping means for engaging a bearing in said die, a broach carrier slidable on said frame, drive means for intermittently recipocating said carrier, said drive means comprising a motor and constant velocity driving connections including nonpositive forward and reverse friction clutches and a brake, and control means for sequentially engaging and disengaging said clutches and brake to effect reciprocation of said broach carrier, said brake terminating translation of said broach carrier in each direction, thereby avoiding jarring engagement of said carrier with a positive stop, said control means including means effective to provide gradual engagement of said clutches.

4. A bearing broaching machine comprising a frame, a bearing die on said frame, clamping means for engaging a bearing in said die, a broach carrier slidable on said frame, drive means for reciprocating said carrier, said drive means comprising a motor and driving connections including forward and reverse clutches, and control means for sequentially engaging and disengaging said clutches to effect translation of said broach carrier in opposite directions, said control means including pneumatic means for operating said clutches and means effective to restrict the flow of air to said pneumatic means while effecting engagement of either of said clutches.

5. A bearing broaching machine comprising a frame, a bearing die on said frame, clamping means for engaging a bearing in said die, a broach carrier slidable on said frame, drive means for reciprocating said carrier, said drive means comprising a motor and driving connections including forward and reverse clutches, and control means for sequentially engaging and disengaging said clutches to effect translation of said broach carrier in opposite directions, said control means including pneumatic cylinder means for operating said clutches, and check valve means restricting the flow of air to said cylinder means on the clutching stroke, while permitting rapid flow of air from said cylinder means on the declutching stroke.

6. A bearing broaching machine comprising a frame, a bearing die on said frame, clamping means for engaging a bearing in said die, a broach carrier slidable on said frame, drive means for intermittently reciprocaitng said carrier, said drive means comprising a motor and constant velocity driving connections including non-positive friction means for gradually initiating and terminating traverse of said broach carrier, thereby avoiding jarring engagement of elements in initiating or terminating said traverse.

7. A bearing broaching machine comprising a frame, a bearing die on said frame, clamping means for engaging a bearing in said die, a broach carrier slidable on said frame, a bearing locator adjacent said die for receiving a bearing to be broached, a reciprocating and swinging arm on said frame, said arm having at its free end a pick-up device, means automatically operated in timed relation to reciprocation of said carrier for lowering said arm to pick up said bearing, for swinging said arm to position said pick-up device over said bearing die, for depressing said arm to deposit said bearing in said die, and for raising said arm to clear said carrier on its following traverse.

8. In a machine of the type described, a frame, a work engaging die on said frame, a tool carrier reciprocable on said frame to positions at opposite sides of said die, a slide reciprocable on said frame, a work locator and a work receiver on said slide, a rotatable column intermediate said die and slide, a yoke mounted on said column for reciprocation longitudinally thereof, said yoke having at each end a pick-up device adapted to interlock releasably with a work piece, and actuating means for reciprocating said carrier and said slide, rotating said column and reciprocating said yoke on said column in sequentially timed relation.

9. In a machine of the type described, a frame, a work engaging die on said frame, a tool carrier reciprocable on said frame to positions at opposite sides of said die, a slide reciprocable on said frame, a work locator and a work receiver on said slide, a rotatable column intermediate said die and slide, a yoke mounted on said column for reciprocation longitudinally thereof, said yoke having at each end a pick-up device adapted to interlock releasably with a work piece, actuating means for reciprocating said carrier, mechanical connections intermediate said carrier and said column to rotate said column upon movement of said carrier, and pneumatic means operable intermediate translation of said carrier to effect a lowering and raising of said yoke on said column.

10. In a machine of the type described, a frame, a work engaging die on said frame, a tool carrier reciprocable on said frame to positions at opposite sides of said die, a slide reciprocable on said frame, a work locator and a work receiver on said slide, a rotatable column intermediate said die and slide, a yoke mounted on said column for reciprocation longitudinally thereof, said yoke having at each end a pick-up device adapted to interlock releasably with a work piece, and actuating means for reciprocating said carrier and said slide, rotating said column and reciprocating said yoke on said column in sequentially timed relation, reciprocation of said slide being between limits which will alternately align said work locator and said work receiver with said column.

11. In a machine of the type described, a frame, a work engaging die on said frame, a tool carrier reciprocable on said frame to positions at opposite sides of said die, a slide reciprocable on said frame, a work locator and a work receiver on said slide, a rotatable column intermediate said die and slide, a yoke mounted on said column for reciprocation longitudinally thereof, said yoke having at each end a pick-up device adapted to interlock releasably with a work piece, and actuating means for reciprocating said carrier and said slide, rotating said column and reciprocating said yoke on said column in sequentially timed relation, reciprocation of said slide being between limits which will alternately align said work locator and said work receiver with said column, said pick-up devices having means operable on the stroke of said yoke into proximity with said die and said work receiver to release a work piece interlocked therewith.

12. In a machine of the type described, a work engaging die to position a work piece for machining, a work locator to receive an unfinished work piece and a work receiver for receiving a finished work piece, transfer mechanism having work engaging pick-up devices, and means operating said mechanism to transfer an unfinished work piece from said locator to said die, and for transferring a finished work piece from said die to said receiver.

13. In a machine of the type described, a work engaging die to position a work piece for machining, a work locator to receive an unfinished work piece and a work receiver for receiving a finished work piece, transfer mechanism having a pair of work engaging pick-up devices, and means operating said mechanism to simultaneously pick up an unfinished work piece from said locator and a finished work piece from said die, and to deposit said unfinished work piece in said die, and said finished work piece in said receiver.

14. In a machine of the type described, a work engaging die to position a work piece for machining, a work locator to receive an unfinished work piece and a work receiver for receiving a finished work piece, transfer mechanism having a pair of work engaging pick-up devices, and means operating said mechanism to simultaneously pick up an unfinished work piece from said locator and a finished work piece from said die, and to deposit said unfinished work piece in said die, and said finished work piece in said receiver, said pick-up devices comprising gripping fingers adapted to interlock with said work pieces, and means automatically operated by movement of said pick-up devices to depositing position to release said fingers.

15. In a machine of the type described, a work engaging die to position a work piece for machining, a slide reciprocable adjacent said die, said slide carrying thereon a work locator to receive an unfinished work piece and a work receiver for receiving a finished work piece, transfer mechanism intermediate said die and said slide comprising a vertically reciprocating and horizontally oscillating yoke having a pair of work engaging pick-up devices, means for reciprocating said slide to position said locator and said receiver alternately adjacent said die, and means for sequentially lowering, raising and oscillating said yoke in such timed relation to said reciprocation of said slide that on one downward stroke of said yoke, said pick-up devices pick up work pieces from said die and locator and on the next downward stroke of said yoke said devices deposit work pieces in both said die and said receiver.

16. In a machine of the type described, a work engaging die to position a work piece for machining, a slide reciprocable adjacent said die, said slide carrying thereon a work locator to receive an unfinished work piece and a work receiver for receiving a finished work piece, transfer mechanism intermediate said die and said slide comprising a vertically reciprocating and horizontally oscillating yoke having a pair of work engaging pick-up devices, means for reciprocating said slide to position said locator and said receiver alternately adjacent said die, means for sequentially lowering, raising and oscillating said yoke in such timed relation to said reciprocation of said slide that on one downward stroke of said yoke, said pick-up devices pick up work pieces from said die and locator and on the next downward stroke of said yoke said devices deposit work pieces in both said die and said receiver, and means operably associated with said pick-up devices effective on said last mentioned stroke to effect positive release of said work pieces therefrom.

17. In a machine of the type described, a work engaging die to position a work piece for machining, a slide reciprocable adjacent said die, said slide carrying thereon a work locator to receive an unfinished work piece and a work receiver for receiving a finished work piece, transfer mechanism intermediate said die and said slide comprising a vertically reciprocating and horizontally oscillating yoke having a pair of work engaging pick-up devices, means for reciprocating said slide to position said locator and said receiver alternately adjacent said die, means for sequentially lowering, raising and oscillating said yoke in such timed relation to said reciprocation of said slide that on one downward stroke of said yoke, said pick-up devices pick up work pieces from said die and locator and on the next downward stroke of said yoke said devices deposit work pieces in both said die and said receiver, and means operably associated with said pick-up devices effective on said last mentioned stroke to effect positive release of said work pieces therefrom, said last means comprising pneumatically actuated gripping fingers, air conduits connected thereto terminating in an inlet nozzle carried by said yoke, and an air supply device engageable with said nozzle on alternate strokes of said yoke.

18. In an automatic bearing broaching machine, a chute for receiving and advancing a series of bearings, a bearing locator for receiving said bearings serially from said chute, a turn-over device for inverting bearings as received in said chute and depositing them in said locator, a clamp associated with said device, means for operating said clamp to engage a bearing during inversion, and for releasing said clamp after inversion to deposit said bearing in said die, a bearing receiver, and a reciprocable transfer device adapted to pick up a bearing from said locator on one stroke and to deposit a bearing in said receiver on the next stroke, said clamp operating means being actuated upon each stroke of said transfer mechanism, and means for preventing operation of said clamp except upon alternate strokes of said transfer mechanism.

19. In an automatic bearing broaching machine, a feeding chute for receiving and advancing a series of downwardly open semi-cylindrical bearings, a bearing locator slidable from a position adjacent the discharge end of said chute to a position away therefrom and formed to receive a bearing in a position inverted from the position in said chute, a turn-over device at the discharge end of said chute adapted to invert the innermost bearing in said chute and to deposit the same in said locator in inverted position, and automatic means for reciprocating said bearing locator and operating said turn-over device in timed relation.

20. In a bearing broaching machine, a chute for receiving a series of upwardly convex, semi-cylindrical bearings, a slide adjacent the discharge end of said chute, a bearing locator and a bearing receiver on said slide, bearing transfer mechanism comprising a rotatable column and a vertically reciprocable yoke on said column, a turn-over device for gripping the first bearing in said chute and inverting it and depositing it in said locator, actuating means for said turn-over device comprising a rack and train of gears, said yoke arranged to reciprocate said rack on alternate down-strokes, and means for reciprocating said slide to position said bearing locator adjacent said turn-over device during operative movements of said rack.

21. In a bearing broaching machine, a chute for receiving a series of upwardly convex, semi-cylindrical bearings, a slide adjacent the discharge end of said chute, a bearing locator and a bearing receiver on said slide, bearing transfer mechanism comprising a rotatable column and a vertically reciprocable yoke on said column, pneumatic means for reciprocating said yoke on said column, a turn-over device, a pneumatically operated clamp for gripping the first bearing in said chute and for inverting it and depositing it in said locator, actuating means for said turn-over device comprising a rack and train of gears, said yoke arranged to reciprocate said rack on alternate down-strokes, and means for reciprocating said slide to position said bearing locator adjacent said turn-over device during operative movements of said rack, said pneumatic means and said pneumatically operated clamp having common air connections adapted to move said yoke downward and to actuate said clamp simultaneously.

22. In a bearing broaching machine, a chute for receiving a series of upwardly convex, semi-cylindrical bearings, a slide adjacent the discharge end of said chute, a bearing locator and a bearing receiver on said slide, bearing transfer mechanism comprising a rotatable column and a vertically reciprocable yoke on said column, pneumatic means for reciprocating said yoke on said column, a turn-over device, a pneumatically operated clamp for gripping the first bearing in said chute and for inverting it and depositing it in said locator, actuating means for said turn-over device comprising a rack and train of gears, said yoke arranged to reciprocate said rack on alternate down-strokes, and means for reciprocating said slide to position said bearing locator adjacent said turn-over device during operative movements of said rack, said pneumatic means and said pneumatically operated clamp having common air connections adapted to move said yoke downward and to actuate said clamp simultaneously, and stop means operated by shifting of said slide effective to prevent clamping movement of said clamp except when said bearing locator is in position to receive a bearing from said turn-over device.

23. A machine of the type described having a work supporting die; releasable clamping means for retaining a work piece in said support; work feeding means comprising a work piece locator, a work piece receiver, and work transfer mechanism adapted to transfer work pieces from the locator to the die, and from the die to the receiver; a tool carriage slidable past the die to positions on either side thereof; and automatic means for controlling said machine comprising a control element responsive to depositing movement of said transfer mechanism to actuate said clamping means, said control element being constructed and arranged such that if more than one work piece is deposited in said die, further operation is arrested.

24. In an automatic bearing broaching machine, a die to receive a bearing, transfer means including a device for depositing a bearing in said die, clamping means for retaining said bearing in said die, an intermittently operated tool carriage movable past said die in broaching relation to a bearing located therein, control means effective upon deposition of a bearing in said die to initiate clamping of said bearing, and other control means effective upon completion of clamping of said bearing to initiate a cutting stroke of said tool carriage.

25. An automatic machine of the type described comprising a frame, a work support on said frame, clamping means for engaging a work piece in said support, a tool carriage intermittently relatively movable past said work support in cutting relation to a work piece clamped therein, a work locator and a work receiver adjacent said work support, work transfer mechanism for transferring work pieces from said locator to said support and from said support to said receiver, automatically controlled actuating means for said machine, and control means therefor, said control means comprising means responsive to transfer of a work piece to said support to operate said clamping means, means responsive to completion of operation of said clamping means to actuate and relatively traverse said tool carriage and work support, means responsive to said relative traverse to release said clamping means and to remove a finished work piece from said work support.

26. In an automatic tool of the character described, a frame, a carriage reciprocable thereon between two limiting positions, a control member movable on said frame from an intermediate neutral position to oppositely located positions effective to initiate forward or reverse movement of said carriage, pneumatic shifting and biasing means connected to said member, said member being located in operative relation to said carriage whereby movement of said carriage to either limiting position shifts said member to neutral position, and air control means effective to apply air to said pneumatic means in a direction opposing said shifting of said member to neutral position, whereby said pneumatic means operates as an air spring to prevent over-shifting of said member.

27. In a machine of the type described, a relatively movable work and tool support, a pneumatically operable clamp for engaging a work piece in said work support, a source of controlled air pressure for operating said clamp, a compensating device including interconnected opposed pistons of different area, means for applying said controlled pressure to the smaller of said pistons, means for applying the developed pressure on said pneumatic means to the larger of said pistons, whereby upon development of a predetermined pressure on said pneumatic means said interconnected pistons move, and means responsive to said movement of said pistons to initiate a relative, cutting traverse of said supports.

28. An automatic bearing broaching machine comprising a frame, a bearing receiving die on said frame, a clamp operable to engage a bearing in said die, a broach carrier movable on said frame to either side of said die, a slide movable on said frame, means interconnecting said slide and carrier for simultaneous reciprocation, a bearing locator and a bearing receiver on said slide movable alternately by said slide into position adjacent said die, a transfer mechanism intermediate said die and said slide comprising a rotatable column and a vertically movable yoke on said column having arms terminating in bearing pick-up and depositing devices, connections intermediate said carrier and column for rotating said column upon traverse of said carrier, means operable when said receiver is adjacent said die to lower said yoke, depositing a finished bearing in said receiver and an unfinished bearing in said die, and to again raise said yoke, means whose operation is initiated by raising of said yoke to operate said clamp, means whose operation is initiated by completion of said clamping operation to traverse said carrier, rotate said column, and shift said slide to a position where said locator is adjacent said die, means operable by said traverse to release said clamp, control means operable by rotation of said column to initiate a second lowering and raising of said yoke to pick up the broached bearing from said die and to pick up an unbroached bearing from said locator, control means operable by said last upward movement of said yoke to initiate reverse traverse of said carrier to initial position, reversely rotating said column and shifting said slide to a position where said receiver is adjacent said die, and control means operable by said last rotation of said column to initiate lowering of said yoke, thus initiating a second cycle.

29. An automatic bearing broaching machine comprising a frame, a bearing receiving die on said frame, a clamp operable to engage a bearing in said die, a broach carrier movable on said frame to either side of said die, a slide movable on said frame, means interconnecting said slide and carrier for simultaneous reciprocation, a bearing locator and a bearing receiver on said slide movable alternately by said slide into position adjacent said die, a chute for receiving a plurality of semi-cylindrical bearings, a turnover device for inverting bearings received from said chute and placing them in said locator, a transfer mechanism intermediate said die and said slide comprising a rotatable column and a vertically movable yoke on said column having arms terminating in bearing pick-up and depositing devices, connections intermediate said carrier and column for rotating said column upon traverse of said carrier, means operable when said receiver is adjacent said die to lower said yoke, depositing a finished bearing in said receiver and an unfinished bearing in said die, and to again raise said yoke, means whose operation is initiated by raising of said yoke to operate said clamp, means whose operation is initiated by completion of said clamping operation to traverse said carrier, rotate said column, and shift said slide to a position where said locator is adjacent said die, means operable by said traverse to release said clamp, control means operable by rotation of said column to initiate a second lowering and raising of said yoke to pick up the broached bearing from said die and to pick up an unbroached bearing from said locator, actuating means for said turn-over device operated by said yoke during its last mentioned up and down movement for inverting a bearing from said chute and placing it in said locator, control means operable by said last upward movement of said yoke to initiate reverse traverse of said carrier to initial position, reversely rotating said column and shifting said slide to a position where said receiver is adjacent said die, and control means operable by said last rotation of said column to initiate lowering of said yoke, thus initiating a second cycle.

30. In a continuously operable fully automatic machine of the character described, a frame, a work holder adjustably carried by said frame, a tool carriage reciprocable on said frame to positions at opposite sides of said work holder, automatic means operable in timed relation to reciprocation of said tool carriage for loading and unloading said work holder, and manual means operable during continuous operation of said machine for adjusting said work holder relative to the path of reciprocation of said tool carriage, said last means comprising an elongated work support carrying said work holder adjacent one end, means for adjusting either end of said support toward or away from the path of reciprocation of said tool carriage, means for adjusting either end of said support transversely of said path, and stop means retaining said support against movement parallel to said path.

31. In a machine of the character described a frame, a carriage mounted for reciprocation on said frame, drive means for reciprocating said carriage, control means for controlling said drive means, said control means including a member mechanically engageable by said carriage during its reciprocation and movable thereby into a position to terminate a stroke of said carriage, said control member having connected thereto a pneumatic means, and connections to said pneumatic means effective during each stroke of said carriage to bias said control member against said movement by said carriage, whereby said pneumatic means prevents over-shifting of said control member by said carriage and additionally cushion stoppage of said carriage.

32. In a machine tool, a frame, a support mounted for adjustment therein in a plurality of right angularly related directions, means for effecting one of said adjustments, means for effecting another of said adjustments without interference with said first mentioned adjustment comprising a pair of members slidably engaging said support, and means connected to said members to apply pressure thereto and to impart simultaneous, equal motion thereto to move said support in the direction of said motion, the said slidable engagement of said members permitting said first adjustment to be made in any position of said second adjustment.

33. A broaching machine comprising a support, a die thereon, means for holding work in the die, a broach carrier intermittently movable on the support, drive means for reciprocating the carrier including a motor and nonpositive forward and reverse friction clutches, and control mechanism for sequentially engaging and disengaging the clutches to effect translation of the carrier in opposite directions.

34. A broaching machine comprising a support, a die thereon, means for holding work in the die, a broach carrier intermittently movable on the support, drive means for reciprocating the carrier including a motor and nonpositive forward and reverse friction clutches, and control mechanism for sequentially and gradually engaging and disengaging the clutches to effect translation of the carrier in opposite directions.

35. In a bearing broaching machine, a work supporting die, a chute for receiving a series of upwardly convex, semicylindrical bearings, a slide adjacent the discharge end of said chute, a bearing locator and a bearing receiver on said slide, transfer mechanism for said bearings between said slide and die registrable with said locator in one position of the slide and with said bearing receiver in another position of said slide, and timed mechanism for operating said transfer mechanism and slide whereby an unfinished bearing is removed from said locator and a finished bearing removed from said die in one operation of said transfer mechanism and while said locator is in registration therewith, and an unfinished bearing is deposited in said die and a finished bearing deposited in said receiver in an alternate operation of said transfer mechanism.

WILLIAM J. FIEGEL.